(12) United States Patent
Saint

(10) Patent No.: US 12,375,304 B2
(45) Date of Patent: *Jul. 29, 2025

(54) MUTUAL AUTHENTICATION OF CONFIDENTIAL COMMUNICATION

(71) Applicant: VISA INTERNATIONAL SERVICE ASSOCIATION, San Francisco, CA (US)

(72) Inventor: Eric Le Saint, Los Altos, CA (US)

(73) Assignee: Visa International Service Association, San Francisco, CA (US)

( * ) Notice: Subject to any disclaimer, the term of this patent is extended or adjusted under 35 U.S.C. 154(b) by 531 days.

This patent is subject to a terminal disclaimer.

(21) Appl. No.: 17/710,587

(22) Filed: Mar. 31, 2022

(65) Prior Publication Data
US 2022/0224551 A1 Jul. 14, 2022

Related U.S. Application Data

(63) Continuation of application No. 16/891,755, filed on Jun. 3, 2020, now Pat. No. 11,323,276, which is a (Continued)

(51) Int. Cl.
*H04L 9/32* (2006.01)
*H04L 9/00* (2022.01)
(Continued)

(52) U.S. Cl.
CPC .......... *H04L 9/3273* (2013.01); *H04L 9/0844* (2013.01); *H04L 9/0869* (2013.01); (Continued)

(58) Field of Classification Search
CPC ... H04L 9/3273; H04L 9/0844; H04L 9/0869; H04L 9/14; H04L 9/3242; H04L 9/3265; (Continued)

(56) References Cited

U.S. PATENT DOCUMENTS 6,052,467 A 4/2000 Brands
6,760,752 B1 7/2004 Liu et al.
(Continued)

FOREIGN PATENT DOCUMENTS

CN 1841997 10/2006
CN 1878060 12/2006
(Continued)

OTHER PUBLICATIONS

Garrett D, Ward M. Blinded Diffie-Hellman: Preventing Eavesdroppers from Tracking Payments. InSecurity Standardisation Research: First International Conference, SSR 2014, London, UK, Dec. 16-17, 2014. Proceedings Jan. 2014 (pp. 79-92). Springer International Publishing. (Year: 2014).*

(Continued)

*Primary Examiner* — Peter C Shaw
(74) *Attorney, Agent, or Firm* — Kilpatrick Townsend & Stockton LLP

(57) ABSTRACT

Embodiments of the invention relate to systems and methods for confidential mutual authentication. A first computer may blind its public key using a blinding factor. The first computer may generate a shared secret using its private key, the blinding factor, and a public key of a second computer. The first computer may encrypt the blinding factor and a certificate including its public key using the shared secret. The first computer may send its blinded public key, the encrypted blinding factor, and the encrypted certificate to the second computer. The second computer may generate the same shared secret using its private key and the blinded public key of the first computer. The second computer may authenticate the first computer by verifying its blinded public key using the blinding factor and the certificate of the first computer. The first computer authenticates the second computer similarly.

18 Claims, 13 Drawing Sheets

Related U.S. Application Data continuation of application No. 15/736,243, filed as application No. PCT/US2016/040590 on Jun. 30, 2016, now Pat. No. 10,708,072.

(60) Provisional application No. 62/187,125, filed on Jun. 30, 2015.

(51) Int. Cl.
  *H04L 9/08*  (2006.01)
  *H04L 9/14*  (2006.01)
  *H04L 9/40*  (2022.01)

(52) U.S. Cl.
  CPC .............. *H04L 9/14* (2013.01); *H04L 9/3242* (2013.01); *H04L 9/3265* (2013.01); *H04L 9/3268* (2013.01); *H04L 63/0428* (2013.01); *H04L 63/0442* (2013.01); *H04L 63/061* (2013.01); *H04L 63/0869* (2013.01); *H04L 9/50* (2022.05); *H04L 2209/04* (2013.01); *H04L 2209/08* (2013.01); *H04L 2209/56* (2013.01)

(58) Field of Classification Search
  CPC ............... H04L 9/3268; H04L 63/0428; H04L 63/0442; H04L 63/061; H04L 63/0869; H04L 9/50; H04L 2209/04; H04L 2209/08; H04L 2209/56; H04L 9/0825; H04L 9/3247; H04L 9/3271
  See application file for complete search history.

(56) References Cited

U.S. PATENT DOCUMENTS

| | | | |
|---|---|---|---|
| 7,039,713 B1 | 5/2006 | Van Gunter et al. | |
| 7,039,946 B1* | 5/2006 | Binding | H04L 63/0823 380/30 |
| 7,628,322 B2 | 12/2009 | Holtmanns et al. | |
| 9,288,208 B1 | 3/2016 | Roth et al. | |
| 9,647,832 B2 | 5/2017 | Le Saint | |
| 10,333,903 B1 | 6/2019 | Campagna et al. | |
| 10,574,633 B2 | 2/2020 | Le Saint et al. | |
| 10,708,072 B2 | 7/2020 | Le Saint | |
| 10,826,712 B2 | 11/2020 | Le Saint et al. | |
| 11,757,662 B2 | 9/2023 | Le Saint et al. | |
| 2002/0067832 A1 | 6/2002 | Jablon | |
| 2002/0095507 A1 | 7/2002 | Jerdonek | |
| 2002/0104006 A1 | 8/2002 | Boate et al. | |
| 2004/0064694 A1* | 4/2004 | Lee | H04L 9/0844 713/168 |
| 2004/0230800 A1 | 11/2004 | Futa et al. | |
| 2005/0050329 A1 | 3/2005 | Wilding et al. | |
| 2005/0154889 A1 | 7/2005 | Ashley et al. | |
| 2006/0106836 A1 | 5/2006 | Masugi et al. | |
| 2006/0198517 A1* | 9/2006 | Cameron | H04L 9/3218 380/44 |
| 2006/0288209 A1 | 12/2006 | Vogler | |
| 2007/0266258 A1 | 11/2007 | Brown et al. | |
| 2008/0141035 A1 | 6/2008 | Furukawa | |
| 2008/0154782 A1 | 6/2008 | Kang et al. | |
| 2008/0320308 A1 | 12/2008 | Kostiainen et al. | |
| 2009/0006860 A1 | 1/2009 | Ross | |
| 2009/0287837 A1 | 11/2009 | Felsher | |
| 2010/0100740 A1 | 4/2010 | Ho | |
| 2011/0307698 A1 | 12/2011 | Vanstone | |
| 2012/0082312 A1* | 4/2012 | Liu | H04L 9/0863 380/262 |
| 2012/0087493 A1 | 4/2012 | Chidambaram et al. | |
| 2012/0221858 A1 | 8/2012 | Struik | |
| 2012/0290830 A1 | 11/2012 | Resch et al. | |
| 2012/0331287 A1 | 12/2012 | Bowman et al. | |
| 2013/0046976 A1 | 2/2013 | Rosati et al. | |
| 2013/0262856 A1 | 10/2013 | Moshfeghi | |
| 2013/0301828 A1 | 11/2013 | Gouget et al. | |
| 2013/0311769 A1 | 11/2013 | Hayes | |
| 2014/0281500 A1 | 9/2014 | Ignatchenko | |
| 2014/0365776 A1* | 12/2014 | Smets | G06Q 20/401 713/171 |
| 2015/0124961 A1 | 5/2015 | Lambert et al. | |
| 2015/0195278 A1 | 7/2015 | Plotkin et al. | |
| 2015/0200774 A1 | 7/2015 | Le Saint | |
| 2015/0280923 A1* | 10/2015 | Camenisch | H04L 9/085 713/155 |
| 2016/0269403 A1 | 9/2016 | Koutenaei et al. | |

FOREIGN PATENT DOCUMENTS

| | | | | |
|---|---|---|---|---|
| CN | 103477585 | | 12/2013 | |
| CN | 103621040 | | 3/2014 | |
| CN | 104463576 | | 3/2015 | |
| CN | 104506534 | A | 4/2015 | |
| CN | 107810617 | | 3/2018 | |
| CN | 107852404 | | 3/2018 | |
| EP | 1577736 | A2 | 9/2005 | |
| EP | 3318003 | | 5/2018 | |
| EP | 3318043 | | 5/2018 | |
| RU | 2202827 | | 4/2003 | |
| RU | 2008101462 | | 7/2009 | |
| RU | 2446606 | | 3/2012 | |
| WO | WO-0195545 | A2 * | 12/2001 | H04L 63/0442 |
| WO | 2013183940 | | 12/2013 | |
| WO | 2016033610 | | 3/2016 | |
| WO | 2017004466 | | 1/2017 | |
| WO | 2017004470 | | 1/2017 | |
| WO | WO-2017004470 | A1 * | 1/2017 | H04L 63/0428 |

OTHER PUBLICATIONS

Overbeck R. A step towards QC blind signatures. Cryptology ePrint Archive. 2009. (Year: 2009).*

Shakerian et al., "An identity based public key cryptography blind signature scheme from bilinear pairings," 2010 3rd International Conference on Computer Science and Information Technology, Chengdu, China, 2010, pp. 28-32, doi: 10.1109/ICCSIT.2010.5563627. (Year: 2010).*

Jeng et al., "A Blind Signature Scheme Based on Elliptic Curve Cryptosystem," 2009 Fifth International Joint Conference on INC, IMS and IDC, Seoul, Korea (South), 2009, pp. 2044-2049, doi: 10.1109/NCM.2009.343. (Year: 2009).*

Zhang et al., "Efficient provable certificateless blind signature scheme," 2010 International Conference on Networking, Sensing and Control (ICNSC), Chicago, IL, USA, 2010, pp. 292-297, doi: 10.1109/ICNSC.2010.5461528. (Year: 2010).*

U.S. Appl. No. 18/231,084 , Non-Final Office Action, Mailed On Mar. 21, 2024, 14 pages.

U.S. Appl. No. 17/080,525 , Notice of Allowance, Mailed On May 1, 2023, 6 pages.

Application No. CN202110920135.X , Office Action, Mailed On Apr. 11, 2023, with English Translation, 17 pages.

U.S. Appl. No. 17/080,525 , Non-Final Office Action, Mailed On Feb. 14, 2023, 8 pages.

Application No. EP17207282.9 , Office Action, Mailed On Jan. 24, 2023, 5 pages.

Application No. CN202110920135.X , Office Action, Mailed On Nov. 29, 2023, with English Translation, 15 pages.

U.S. Appl. No. 15/577,898 , "Corrected Notice of Allowability", Jul. 29, 2020, 3 pages.

U.S. Appl. No. 15/577,898 , Non-Final Office Action, Mailed On Mar. 27, 2020, 35 pages.

U.S. Appl. No. 15/577,898 , Notice of Allowance, Mailed On Jun. 26, 2020, 11 pages.

U.S. Appl. No. 15/736,243 , Notice of Allowance, Mailed On Mar. 4, 2020, 18 pages.

U.S. Appl. No. 16/891,755 , "Corrected Notice of Allowability", Feb. 16, 2022, 3 pages.

U.S. Appl. No. 16/891,755 , First Action Interview Pilot Program Pre-Interview Communication, Mailed On Nov. 10, 2021, 5 pages.

(56) References Cited

OTHER PUBLICATIONS

U.S. Appl. No. 16/891,755, Notice of Allowance, Mailed On Jan. 14, 2022, 11 pages.
Application No. CN201680038929.0, Notice of Decision to Grant, Mailed On May 27, 2021, 6 pages.
Application No. CN201680038929.0, Office Action, Mailed On Nov. 30, 2020, 14 pages.
EP16818853.0, "Summons to Attend Oral Proceedings", Apr. 7, 2021, 9 pages.
Application No. EP17207282.9, Office Action, Mailed On Apr. 30, 2021, 5 pages.
EP22156874.4, "Extended European Search Report", May 16, 2022, 9 pages.
Application No. CN202110920135.X, Office Action, Mailed On Nov. 22, 2022, English Translation, 9 pages.
Application No. CN202110920135.X, Office Action, Mailed On Aug. 10, 2023, 15 pages.
U.S. Appl. No. 18/231,084, Final Office Action, Mailed On Aug. 9, 2024, 8 pages.
Application No. CN201680038929.0, Office Action, Mailed On Apr. 20, 2020, 24 pages.
Application No. EP16818853.0, Notice of Decision to Grant, Mailed On Feb. 24, 2022, 2 pages.
Application No. EP16818857.1, Notice of Decision to Grant, Mailed On Aug. 20, 2020, 2 pages.
Application No. EP17207282.9, Office Action, Mailed On Feb. 28, 2020, 4 pages.
Application No. PCT/US2016/040586, International Preliminary Report on Patentability, Mailed On Jan. 11, 2018, 14 pages.
Application No. PCT/US2016/040590, International Preliminary Report on Patentability, Mailed On Jan. 11, 2018, 15 pages.
AU2016287728, "First Examination Report", Dec. 13, 2019, 3 pages.
Application No. EP16818853.0, Extended European Search Report, Mailed On Jan. 23, 2019, 10 pages.
Application No. EP16818857.1, Extended European Search Report, Mailed On May 14, 2018, 9 pages.
Application No. EP17207282.9, Extended European Search Report, Mailed On May 29, 2018, 10 pages.
Garrett et al., "Blinded Diffie-Hellman Preventing Eavesdroppers from Tracking Payments", International Conference on Financial Cryptography and Data Security, Dec. 16, 2014, pp. 79-92.
Han et al., "Privacy-Preserving Transactions Protocol Using Mobile Agents with Mutual Authentication", International journal of Information security and privacy 1.1, 2007, pp. 35-46.
Ndibanje et al., "Security Analysis and Improvements of Authentication and Access Control in the Internet of Things", Sensors, vol. 14, No. 8, Aug. 2014, pp. 14786-14805.
Application No. PCT/US2016/040586, International Search Report and Written Opinion, Mailed On Oct. 14, 2016, 15 pages.
Application No. PCT/US2016/040590, International Search Report and Written Opinion, Mailed On Sep. 12, 2016, 18 pages.
Application No. RU2018103181, Office Action, Mailed On Dec. 30, 2019, 19 pages.
Application No. RU2018103183, Office Action, Mailed On Dec. 17, 2019, 21 pages.
AU2016287732, "First Examination Report," Feb. 3, 2020, 4 pages.
Application No. EP168188530.0, Office Action, Mailed on Feb. 27, 2020, 6 pages.
U.S. Appl. No. 18/231,084, Notice of Allowance, Mailed On Oct. 25, 2024, 6 pages.

* cited by examiner

800 ⟶

Method performed by a Second Computer

801 — Generate a second computer blinded public using a second computer blinding factor and a second computer public key 802 — Send the second computer blinded public key to a first computer 803 — Receive a first computer blinded public key from the first computer 804 — Generate a first shared secret using the first computer blinded public key, the second computer blinding factor, and a second computer private key corresponding to the second computer public key 805 — Communicate with the first computer using the first shared secret

|      |          | Client Computer | Server Computer |
|------|----------|-----------------|-----------------|
|      | Known    | $Q\_s\_\{n\}$, $C\_s\_\{n\}$, $SD\_c$ | |
|      |          | $C\_c$, $d\_c$, $Q\_c = [d\_c]$ P, seed | |
|      | Known    | | $d\_s\_\{n\}$, $C\_s\_\{n\}$, $Q\_s\_\{n\} = [d\_s\_\{n\}]$ P, |
|      |          | | $d\_s\_\{n+1\}$, $C\_s\_\{n+1\}$, $Q\_s\_\{n+1\} = [d\_s\_\{n+1\}]$ P, |
|      |          | | IV, $SD\_s$ |
|      | Start -------- | | |
| 1201 | Generate | $d\_bc = $ PRNG (seed) # [0..q-1] | |
| 1202 | Execute  | $Q\_bc = [d\_bc \cdot d\_iv] Q\_c$ | |
| 1203 |          | $Z\_1 = [d\_c \cdot d\_bc] Q\_s\_\{n\}$ | |
| 1204 |          | $sID\_c = $ x-coord ( $Q\_bc$ ) | |
| 1205 |          | $sk\_1c = $ KDF ($Z\_1$, $ID\_s$, $sID\_c$ ) | |
| 1206 |          | $enc\_c = $ AEAD ( $sk\_1c$, $SD\_c$ \| $C\_c$ \| ($d\_bc$ or seed) \| $PAD\_c$, $Q\_bc$) | |
| 1207 |          | zeroize $Z\_1$, $sk\_1c$ | |
| 1208 | Send     | $Q\_bc$, $enc\_c$ | |
| 1209 |          | ----------------------------> | |
| 1210 | Validate | | $Q\_bc$          #belong EC domain |
| 1211 | Execute  | | $Z\_1 = [d\_s \cdot d\_iv] Q\_bc$ |
| 1212 |          | | $sID\_c = $ x-coord ( $Q\_bc$ ) |
| 1213 |          | | $sk\_1c = $ KDF ($Z\_1$, $ID\_s$, $sID\_c$) |
| 1214 |          | | $SD\_c$ \| $C\_c$ \| ($d\_bc$ or seed) \| $PAD\_c$ = AEAD-1 ( $sk\_1c$, $enc\_c$, $Q\_bc$) |
| 1215 |          | | Zeroize $sk\_1c$, $Z\_1$ |
| 1216 |          | | If (seed) $d\_bc = $ PRNG (seed) # check seed freshness: counter, time, |
| 1217 |          | | etc |
| 1218 |          | | $Q\_c = $ PubK( $C\_c$), Validate $C\_c$ |
| 1219 |          | | Check $Q\_bc = [d\_bc] \cdot Q\_c$ |
| 1220 | Generate | | $d\_bs$            # 0..q-1 |
| 1221 | Execute  | | $Z = [d\_bs \cdot d\_s\_\{n+1\}] Q\_bc$ |
| 1222 |          | | $Q\_bs = [d\_bs] \cdot Q\_s$ |
| 1223 |          | | $sID\_s = $ x-coord ($Q\_bs$) |
| 1224 |          | | $sk\_s$ \| $sk\_c = $ KDF ( $Z$, $sID\_s$, $sID\_c$) |
| 1225 |          | | $Enc\_s = $ AEAD ( $sk\_s$, $d\_bs$ \| $C\_s\_\{n+1\}$ \| $SD\_s$ \| $PAD\_s$, $Q\_bs$) |
|      |          | | Zeroize $sk\_s$, $Z$ |
| 1226 |          | | Send $Q\_bs$, $enc\_s$ |
| 1227 |          | <-------------------------- | |
| 1228 | Validate | $Q\_bs$ #belong EC domain | |
| 1229 | Execute  | $Z = [d\_c \cdot d\_bc] Q\_bs$ | |
| 1230 |          | $sID\_s = $ x-coord ($Q\_bs$) | |
| 1231 |          | $sk\_s$ \| $sk\_c = $ KDF ( $Z$, $sID\_s$, $sID\_c$) | |
| 1232 |          | Zeroize $Z$, $d\_bc$ | |
| 1233 |          | $d\_bs$ \| $C\_s\_\{n+1\}$ \| $SD\_s$ \| $PAD\_s$ = AEAD-1 ($sk\_s$, $enc\_s$, $Q\_bs$) | |
| 1234 |          | $Q\_s\_\{n+1\} = $ PubK($C\_s\_\{n+1\}$) | |
| 1235 | Validate | $C\_s\_\{n+1\}$ (belong to EC domain) | |
|      |          | $d\_bs \cdot Q\_s\_\{n+1\} = Q\_bs$ | |
|      |          | -- end or continue secure messaging with $sk\_s$, $sk\_c$ -------------------- | |

| | | Client Computer | Server Computer |
|---|---|---|---|
| | Known | | $d\_s$, $C\_s$, $Q\_s = [d\_s] P$, $SD\_s$ |
| | Known | $d\_c$, $C\_c$, $Q\_c = [d\_c] P$ | |
| | Start | --------------------------------------------------------------------------- | |
| 1301 | Generate | $d\_bc$ # $[0..q-1]$ | |
| 1302 | Execute | $Q\_bc = [d\_bc] Q\_c$ | |
| 1303 | | $sID\_c = $ x-coord ( $Q\_bc$ ) | |
| 1304 | | Send $Q\_bc$ | |
| | | ---------------------------> | |
| 1305 | Validate | | $Q\_bc$ belongs EC domain? |
| 1306 | Generate | | $d\_bs$ # $[0..q-1]$ |
| 1307 | Execute | | $Z = [d\_bs \cdot d\_s] Q\_bc$ |
| 1308 | | | $Q\_bs = [d\_bs] Q\_s$ |
| 1309 | | | $sID\_c = $ x-coord ( $Q\_ec$ ) |
| 1310 | | | $sID\_s = $ x-coord($Q\_bs$) |
| 1311 | | | $sk\_s \mid sk\_c = $ KDF ( $Z$, $sID\_s$, $sID\_c$ ) |
| 1312 | | | $enc\_s = $AEAD($sk\_s$, $d\_bs \mid C\_s \mid SD\_s \mid PAD\_s$, $Q\_bs$) |
| 1313 | | | Zeroize $sk\_s$, $Z$ |
| 1314 | | | Send $Q\_bs$, $enc\_s$ |
| | | <--------------------------- | |
| 1315 | Validate | $Q\_bs$ #belong EC domain | |
| 1316 | Execute | $Z = [d\_c \cdot d\_bc] Q\_bs$ | |
| 1317 | | $sID\_s = $ x-coord($Q\_bs$) | |
| 1318 | | $sk\_s \mid sk\_c = $ KDF ( $Z$, $sID\_s$, $sID\_c$ ) | |
| 1319 | | Zeroize $Z$, $d\_bc$ | |
| 1320 | | $d\_bs \mid C\_s \mid SD\_s \mid PAD\_s = $ AEAD-1 ($sk\_s$, $enc\_s$, $Q\_bs$) | |
| 1321 | | $Q\_s = $ PubK($C\_s$) | |
| 1322 | Validate | $Q\_s$ belongs to EC domain? | |
| 1323 | | Verify $C\_s$ | |
| 1324 | | Check that ([$d\_bs$] $Q\_s$) = $Q\_bs$ | |
| 1325 | | Zeroize $d\_bs$ | |
| 1326 | | Server Authenticated | |
| 1327 | Execute | $enc\_c = $ AEAD($sk\_c$, $d\_bc \mid C\_c \mid SD\_c \mid PAD\_c$), NULL) | |
| 1328 | | Send $enc\_c$ | |
| | | ---------------------------> | |
| 1329 | Execute | | $sk\_c$, $d\_bc \mid C\_c \mid SD\_c \mid PAD\_c = $ AEAD-1($sk\_c$, $enc\_c$) |
| 1330 | Validate | | Extract $Q\_c$ from $C\_c$, Validate $C\_c$ |
| 1331 | | | #check $Q\_bc = [d\_bc] \cdot Q\_c$. |
| 1332 | | | Zeroize $d\_bc$ |
| 1333 | | | Client Authenticated. |
| 1334 | | -- end or continue secure messaging with $sk\_s$, $sk\_c$ ----------------------------------- | |

*FIG. 13*

MUTUAL AUTHENTICATION OF CONFIDENTIAL COMMUNICATION

CROSS REFERENCE TO RELATED APPLICATIONS

The present application is a continuation of U.S. patent application Ser. No. 16/891,755, filed on Jun. 3, 2020, which is a continuation of U.S. patent application Ser. No. 15/736,243, filed on Dec. 13, 2017, which is a 371 National Phase of International Patent Application No. PCT/US2016/040590, filed on Jun. 30, 2016, which claims the benefit of the filing date of U.S. Provisional Application No. 62/187,125, filed on Jun. 30, 2015, the entire contents of which are incorporated by reference herein. In addition, U.S. application Ser. No. 14/595,792, now U.S. Pat. No. 9,647,832 issued May 9, 2017, and U.S. application Ser. No. 14/743,874, now U.S. Pat. No. 10,574,633 issued Feb. 25, 2020 are incorporated by reference herein in their entireties.

BACKGROUND

Ensuring that data is securely communicated between computers continues to be a concern. For instance, an attacker may attempt to eavesdrop on communications (e.g., by conducting a man-in-the-middle attack). Thus, an attacker may attempt to intercept data, such as a public key, that can be used to infer the identity of a user, a client computer, or a server computer. An attacker may also attempt to intercept identification data, such as a computer identifier or a public key of the computer, or authentication data, such as a password, transmitted by the computer. The intercepted data could be used to track the user device or it may be used for illicit purposes. Further complicating matters is the prior state of the computers before communicating. In some cases, the client computer and the server may not previously store a digital certificate of each other—in other words, the client computer and the server computer may not trust each other a priori. Conducting secure communications in such circumstances may pose a challenge.

Embodiments of the present invention address these and other problems individually and collectively.

BRIEF SUMMARY

Some embodiments of the invention relate to systems and methods for securely authenticating a computer. In some embodiments, a first computer may generate a first computer blinded public key using a first computer blinding factor and a first computer public key of the first computer. The first computer may generate a first shared secret using a first computer private key corresponding to the first computer public key, the first computer blinding factor, and a second computer public key of a second computer. The first computer may encrypt first authentication information of the first computer using the first shared secret to obtain first encrypted authentication information. In some embodiments, the first authentication information may include one or more of the first computer blinding factor, a time stamp, or a certificate of the first computer. The first computer may send to the second computer, a first message including the first computer blinded public key and the first encrypted authentication information.

The second computer may receive the first message including the first computer blinded public key and the first encrypted authentication information from the first computer. The second computer may generating the first shared secret using the first computer blinded public key and a second computer private key corresponding to the second computer public key. The second computer may decrypt the first encrypted authentication information using the first shared secret. The second computer may authenticate the first computer using the first authentication information. In response to authenticating the first computer, the second computer may encrypt second authentication information of the second computer based on the second computer private key and the first computer public key. The second computer may send a second message to the first computer including the second encrypted authentication information. The first computer may decrypt the second encrypted authentication information based on the first computer private key and the second computer public key. The first computer may authenticate the second computer based on the second authentication information.

Some embodiments of the invention relate to systems and methods for confidential communication between computers. A first computer may receive a first message including a second computer blinded public key from a second computer. The second computer blinded public may be generated by the second computer using a second computer blinding factor and a second computer public key that corresponds to a second computer private key. The first computer may generate a first computer blinded public key using a first computer blinding factor and a first computer public key. The first computer may generate a first shared secret using a first computer private key corresponding to the first computer public key, the first computer blinding factor, and the second computer blinded public key. The first computer may send a second message including the first computer blinded public key to the second computer. The second message may enable the second computer to generate the first shared secret using the first computer blinded public key, the second computer blinding factor, and a second computer private key corresponding to the second computer public key. The first computer and the second computer may communicate using the first shared secret.

Other embodiments are directed to systems, portable consumer devices, and computer readable media associated with methods described herein.

A better understanding of the nature and advantages of embodiments of the present invention may be gained with reference to the following detailed description and the accompanying drawings.

BRIEF DESCRIPTION OF THE DRAWINGS

FIG. 8 shows a flowchart of a method performed by a second computer for establishing dually confidential communications with a first computer, in accordance with some embodiments.

FIG. 12 shows a method for secure communication using a client computer that is pre-loaded with a server computer certificate, in accordance with some embodiments.

FIG. 13 shows a method for secure communication using a client computer that is not pre-loaded with a server computer certificate, in accordance with some embodiments.

TERMS

Figure 1:
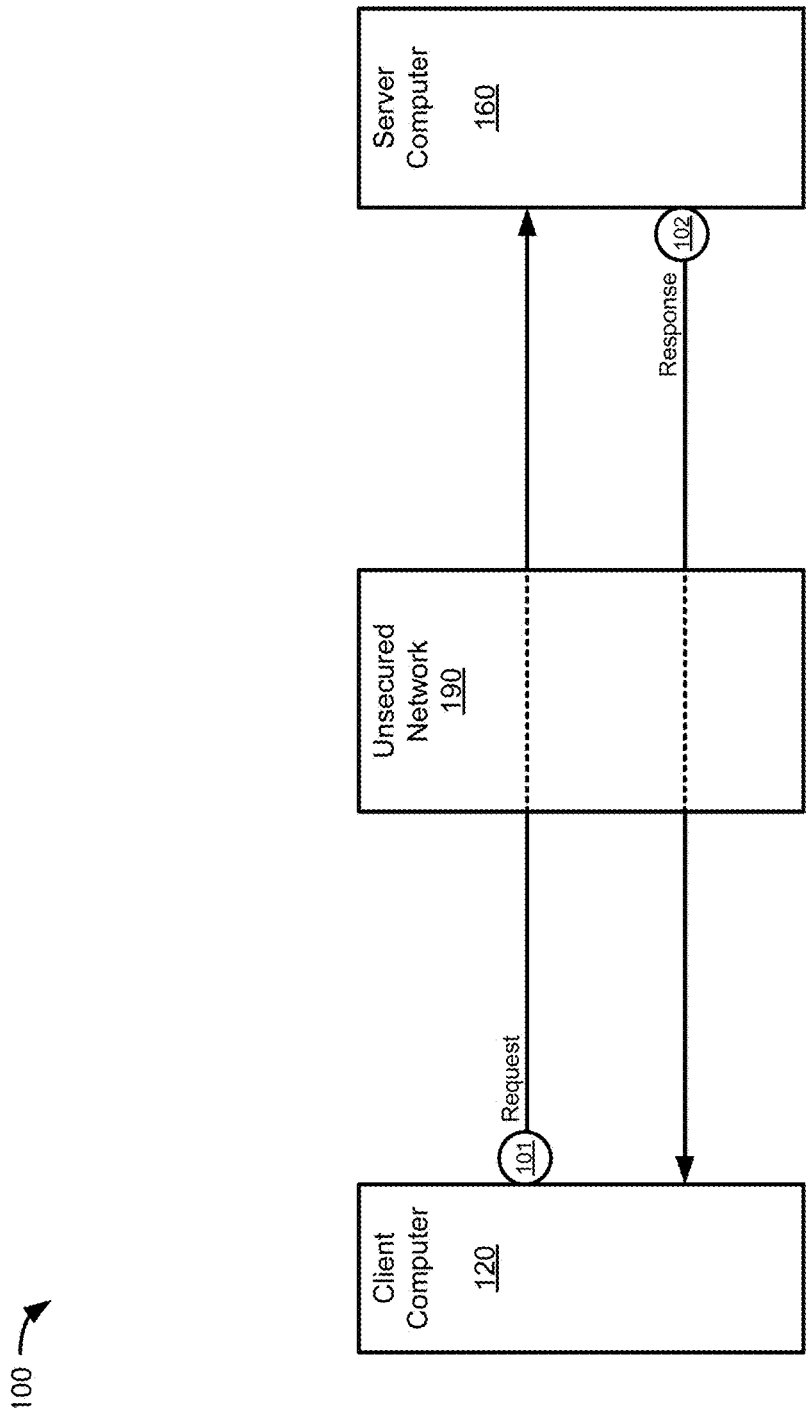
FIG. 1 shows a simplified message flow diagram illustrating secure communication between a client computer and a server computer, in accordance with some embodiments.

Prior to discussing embodiments of the invention, description of some terms may be helpful in understanding embodiments.

The term "server computer" may include a computer or cluster of computing devices. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

The term "public/private key pair" may include a pair of linked cryptographic keys generated by an entity (e.g., a computer or an electronic device). The public key may be used for public functions such as encrypting a message to send to the entity or for verifying a digital signature which was supposedly made by the entity. The private key, on the other hand may be used for private functions such as decrypting a received message or applying a digital signature. The public key will usually be authorized by a body known as a Certification Authority (CA) which stores the public key in a database and distributes it to any other entity which requests it. The private key will typically be kept in a secure storage medium and will usually only be known to the entity. However, the cryptographic systems described herein may feature key recovery mechanisms for recovering lost keys and avoiding data loss. Public and private keys may be in any suitable format, including those based on RSA or elliptic curve cryptography (ECC).

A "digital signature" may refer to the result of applying an algorithm based on a public/private key pair, which allows a signing party to manifest, and a verifying party to verify, the authenticity and integrity of a document. The signing party acts by means of the private key and the verifying party acts by means of the public key. This process certifies the authenticity of the sender, the integrity of the signed document and the so-called principle of nonrepudiation, which does not allow disowning what has been signed. A certificate or other data that includes a digital signature by a signing party is said to be "signed" by the signing party.

A "certificate" or "digital certificate" may include an electronic document or data file that uses a digital signature to bind a public key with data associated with an identity. The certificate may include one or more data fields, such as the legal name of the identity, a serial number of the certificate, a valid-from and valid-to date for the certificate, certificate-related permissions, etc. A certificate may contain a "valid-from" date indicating the first date the certificate is valid, and a "valid-to" date indicating the last date the certificate is valid. A certificate may also contain a hash of the data in the certificate including the data fields. Unless otherwise noted, each certificate is signed by a certificate authority.

A "certificate authority" (CA) may include one or more server computers operatively coupled to issue certificates to entities. The CA may prove its identity using a CA certificate, which includes the CA's public key. The CA certificate may be signed by another CA's private key, or may be signed by the same CA's private key. The latter is known as a self-signed certificate. The CA may maintain a database of all certificates issued by the CA, and may also maintain a list of revoked certificates.

In a typical process, the certificate authority receives an unsigned certificate from an entity whose identity is known. The unsigned certificate includes a public key, one or more data fields, and a hash of the data in the certificate. The CA signs the certificate with a private key corresponding to the public key included on the CA certificate. The CA may then store the signed certificate in a database, and issue the signed certificate to the entity.

A "cryptographic nonce" may include any number, string, bit sequence, or other data value intended to be used in association with a single communication session. In some cases, a cryptographic nonce may be randomly or pseudo-randomly generated. Typically, a cryptographic nonce is of sufficient length as to make insignificant the likelihood of independently generating the same nonce value multiple times.

A "blinded key," such as a "blinded public key" may include a key that has been obfuscated or otherwise modified from its original value by combination with another data element, such as a cryptographic nonce. For example, in elliptic curve cryptography, a public key may be multiplied by the nonce to generate a "blinded public key." Similarly, a private key may be multiplied by the nonce to generate a "blinded private key." The nonce may have the same bit-length as the public key and the private key.

An "ephemeral key pair" may include a public key (i.e., an "ephemeral public key") and a private key (i.e., an "ephemeral private key") generated for use with a single transaction or other communication session. The ephemeral key pair may be of any suitable format, such as ECC or RSA.

Typically, an ephemeral key pair may is deleted once the transaction or communication session has concluded.

A "static key pair" may include a public key (i.e., a "static public key") and a private key (i.e., a "static private key") maintained over a period of time. Typically, though not necessarily, a static private key may be stored securely, such as in a hardware security module (HSM) or secure element (SE). Typically, though not necessarily, a static public key may be bound to an identity through the use of a digital certificate. The static key pair may be of any suitable format, such as ECC or RSA.

A "shared secret" may include any data value or other information known only to authorized parties in a secure communication. A shared secret can be generated in any suitable manner, from any suitable data. For example, a Diffie-Hellman based algorithm, such as Elliptic-Curve Diffie-Hellman (ECDH) may be used to generate a shared secret from a private key and a public key. For example, a first computer may generate a first key pair include a first public key and a first private key. A second computer may generate a second key pair including a second public key and a second private key. The first computer may generate a shared secret using the second public key of the second computer and the first private key of the first computer. The second computer may generate the same shared secret using the first public key of the first computer and the second private key of the second computer. The first computer and the second computer may both use the shared secret to generate a session key.

The term "identification data" may include any data or information associated with a user or device. Examples of identification data may include a name of a user associated with the device, an organization associated with the device, payment information such as a primary account number (PAN) associated with the device, an expiration date of the device, a certificate associated with the device, an IMEI or serial number of the device, etc.

The term "authentication" generally refers to a process of establishing confidence in the identity of a user or a computer. Authentication may be performed by confirming the identity of a device using public key cryptography (e.g., encrypted data or digital signatures) for authentication information.

The term "authentication data" or "authentication information" may include any data or information suitable to authenticate a user or device. Examples of authentication data may include a password or passphrase, a secret key (e.g., a private key), a digital signature, an indication that the device is storing certain information, etc.

An "encryption key" may include any data value or other information suitable to cryptographically encrypt data. A "decryption key" may include any data value or other information suitable to decrypt encrypted data. In some cases, the same key used to encrypt data may be operable to decrypt the data. Such a key may be known as a symmetric encryption key.

A "session key" may include any key used to encrypt or decrypt data to be securely communicated. In some cases, a session key may be generated from a shared secret known both to a sending entity and a receiving entity. For example, the session key may be derived using a key derivation function and the shared secret.

DETAILED DESCRIPTION

Some embodiments of the invention relate to confidential communication systems and methods, and confidential mutual authentication systems and methods.

A first computer and a second computer may communicate over an unsecured network. In order to exchange secure communications, the first computer and the second computer may share a secret symmetric key used to encrypt communications. To prevent an eavesdropper from obtaining the secret symmetric key, the two computers can use public/private key pairs and separately generate the secret symmetric key using a public key of the other device and its own private key.

The public keys can be sent over the network, but this may allow a third party to determine the identity of one of the computers or eventually determine the shared symmetric key. It is possible to use ephemeral key pairs, but the generation of ephemeral key pairs for every new communication is computationally intensive. Embodiments can use static public/private key pairs for computational efficiency, where public keys of both computers can be blinded and then transmitted. The generation of the shared symmetric key can account for the blinding, as well as perform dynamic blinding for new communications, where the blinding factor can change with new communications. Further, in embodiments, the two computers can authenticate each other, even with the blinding of the public keys, e.g., by including the public keys in encrypted payloads, which can be decrypted by the other computer.

I. Secure Communications

A Diffie-Hellman key exchange may enable a first computer and a second computer to establish a secret symmetric key over an unsecured network without transmitting the secret symmetric key itself. The Diffie-Hellman key exchange may not be based on any information previous stored at the first or second computer before the key exchange. For example, a Diffie-Hellman based algorithm, such as Elliptic-Curve Diffie-Hellman (ECDH) may be used to generate a shared secret from a private key of a first computer and a public key of a second computer. For example, the first computer may generate a first key pair include a first public key and a first private key. The second computer may generate a second key pair including a second public key and a second private key. The first computer may send its first public key to the second computer and the second computer may send its second public key to the first computer. The first computer may generate a shared secret using the second public key of the second computer and the first private key of the first computer. The second computer may generate the same shared secret using the first public key of the first computer and the second private key of the second computer. The first computer and the second computer may both use the shared secret to generate a session key for encrypting communications. As such, the first computer and the second computer may establish secure communications over an unsecured network without using any pre-installed information.

FIG. 1 shows a simplified message flow diagram 100 illustrating secure communication between a client computer 120 and a server computer 160, in accordance with some embodiments. The message flow diagram 100 may be used between any first computer and any second computer. The client/server distinction is of FIG. 1 is exemplary and made to improve readability. In some embodiments, the client computer 120 may perform the operations described as being performed by the server computer 160. In some embodiments, the server computer 160 may perform the operations described as being performed by the client computer 120.

Referring to FIG. 1, the client computer 120 may store a client key pair comprising a client public key and a client private key corresponding to the client public key. The client key pair may be static. The server computer 160 may store a server key pair comprising a server public key and a server private key corresponding to the server public key. The server key pair may be static. The client computer 120 and the server computer 160 may communicate over an unsecured network 190 (e.g., the internet or a wireless local area network). The client computer 120 and the server computer 160 may perform a key exchange in order to establish secure communications over the unsecured network 190. For example, the client computer 120 and the server computer 160 may perform a Diffie-Hellman key exchange as described above to establish a shared secret between the client computer 120 and the server computer 160. The client computer 120 and the server computer 160 may each derive a session key from the shared secret for encrypting and decrypting communications between each other.

As shown in FIG. 1, the client computer 120 may transmit a request message to the server computer 180. In some embodiments, the request message may include identification data. The client computer 120 may encrypt the identification data of the response message using the shared secret to obtain encrypted identification data. At 101, the client computer 120 may transmit the request message including the encrypted identification data to the server computer 160 over an unsecured network 190.

The server computer 160 may receive the request message from the client computer 120 via the unsecured network 190. The server computer 160 may decrypt the encrypted identification data of the request message using the shared secret (e.g., using the session key derived from the shared secret). The server computer 160 may also verify the identification data based on data stored at the server computer 160. The server computer 160 may encrypt payload data for the client computer 120 using the shared secret to obtain encrypted payload data. At 102, the server computer 160 may transmit a response message including the encrypted payload data to client computer 120. The server computer 160 may transmit the response data to the client computer 120 in response to verifying the identification data received from the client computer 120. The client computer 120 may receive the response message and decrypt the encrypted payload data using the session key to obtain the payload data. As such, the client computer 120 and the server computer 160 may securely communicate over the unsecured network 190 by performing a Diffie-Hellman key exchange.

However, a Diffie-Hellman key exchange, such as the key exchange described above with respect to FIG. 1, may involve a first computer (e.g., the client computer 120) sending its first public key to a second computer (e.g., the server computer 160) and the second computer sending its second public key to the first computer. As such, an eavesdropping computer may track the identity of the first computer based on the first public key and it may also track the identity of the second computer based on the second public key. In addition, the eavesdropping computer may conduct a man-in-the-middle attack or imitate the first computer or the second computer. Some of the embodiments described below address these issues.

II. Efficient and Dually Confidential Communications

As discussed above, transmission of static public keys may enable an eavesdropping computer to track the identity of a computer. The eavesdropping computer may also conduct a man-in-the-middle attack or imitate the computer. Some embodiments may address this issue by blinding public keys such that they are confidential.

Figure 2:
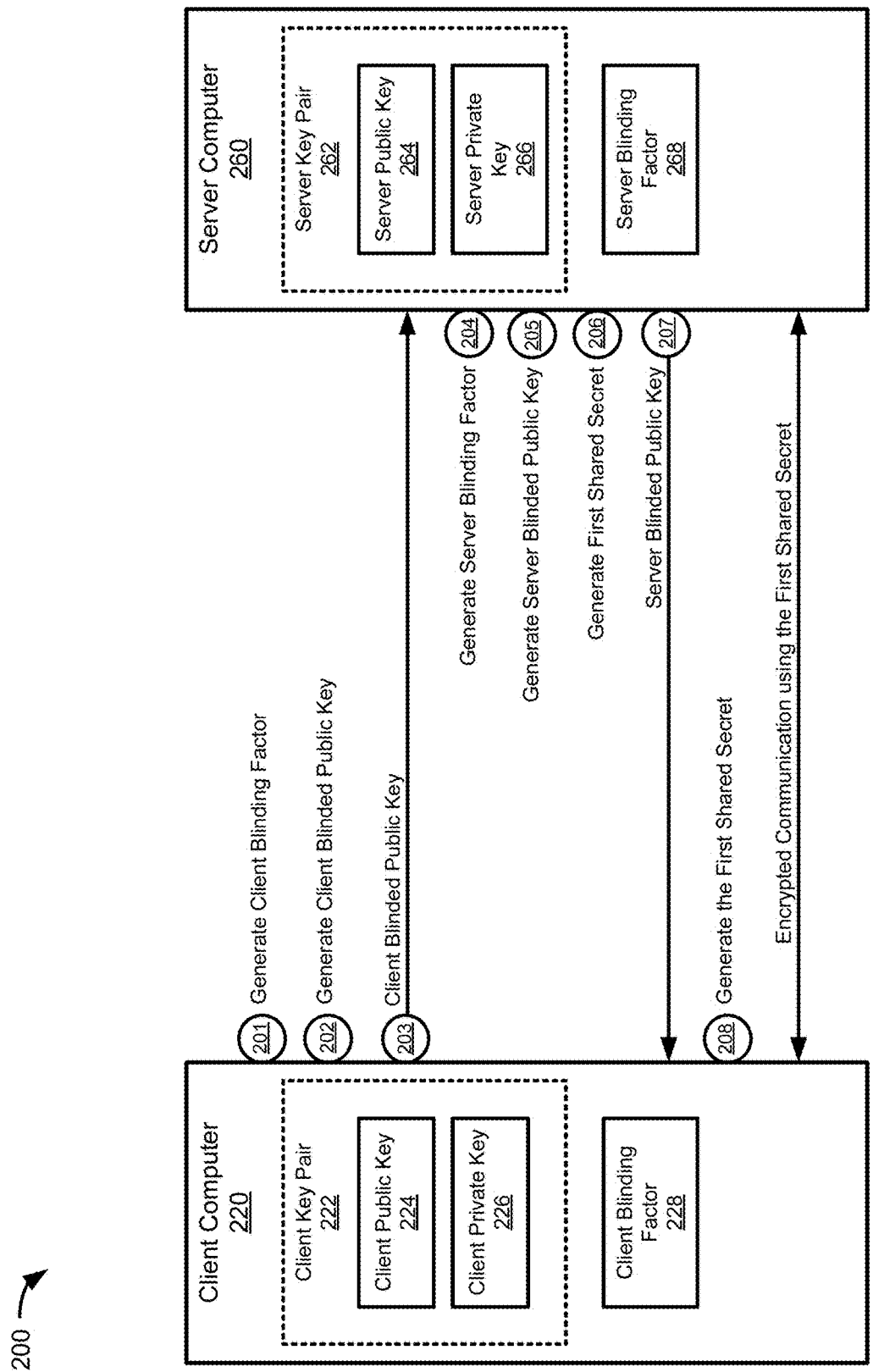
FIG. 2 shows a message flow diagram of a client computer and a server computer efficiently establishing dually confidential communications, in accordance with some embodiments.

FIG. 2 shows a message flow diagram 200 of a client computer 220 and a server computer 260 efficiently establishing dually confidential communications, in accordance with some embodiments. In this message flow, the identify of both the client computer 220 and the server computer 260 remain confidential because only blinded public keys may be transmitted (e.g., over an unsecured network), instead of transmitting static public keys. The blinded public keys may be used to establish a shared secret for secure encrypted communication. In addition, the process of generating and using blinded public keys may be more efficient than alternative methods of providing confidential communication (e.g., methods generating and using ephemeral key pairs).

The message flow diagram 200 may be used between any first computer and any second computer. The client/server distinction is of FIG. 2 is exemplary and made to improve readability. In some embodiments, the client computer 220 may perform the operations described as being performed by the server computer 260. In some embodiments, the server computer 260 may perform the operations described as being performed by the client computer 220.

Prior to the message flow of FIG. 2, the client computer 220 may store a client key pair 222 including a client public key 224 and a client private key 226 corresponding to the client public key 224. The client key pair 222 may be a static key pair. The client computer 220 may also store a client certificate including the client public key 224. Prior to the message flow of FIG. 2, the server computer 260 may store a server key pair 262 including a server public key 264 and a server private key 266 corresponding to the server public key 264. The server key pair 262 may be a static key pair. The server computer 260 may also store a server certificate including the server public key 264.

At 201, the client computer 220 may generate a client blinding factor 228. The client blinding factor may be a cryptographic nonce. A client blinding factor bit-length of the client blinding factor may be shorter than a client public key bit-length of the client public key 224. At 202, the client computer may generate a client blinded public key using the client public key and the client blinding factor. For example, the client computer may perform a multiplication operation on the client public key and the client blinding factor. Generating the client blinded public key using the client blinding factor 228 may be more computationally efficient (e.g., may use less computer resources) compared to generating an ephemeral key pair in embodiments where the client blinding factor bit-length of the client blinding factor is shorter than the client public key bit-length of the client public key. While the generation of the client blinded public key may be more computationally efficient, the client blinded public key may provide a similar level of security compared to the use of ephemeral keys since the client blinded public key and the ephemeral public key may have the same bit-length. At 203, the client computer 203 may send the client blinded public key to the server computer.

The server computer 260 may receive the client blinded public key from the client computer 220. At 204, the server computer 260 may generate a server blinding factor 268. The server blinding factor 268 may be a cryptographic nonce. A server blinding factor bit-length of the server blinding factor may be shorter than a server public key bit-length of the server public key 264. At 205, the server computer 260 may generate a server blinded public key using the server public key 264 and the server blinding factor 268. For example, the server computer 260 may perform a multiplication operation on the server public key 264 and the server blinding factor 268.

At 206, the server computer 260 may generate a first shared secret using the client blinded public key received from the client computer 220, the server private key 266, and the server blinding factor 268. The server computer 260 may derive a first session key for encrypting data using the first shared secret. The server computer 260 may encrypt server data for the client computer using the first session key derived from the first shared secret to obtain encrypted server data. For example, the server data may include the server certificate including the server public key. The server computer 260 may send the server certificate to the client computer 220 to enable the client computer 220 to authenticate the server computer 260. At 207, the server computer 260 may send the server blinded public key to the client computer 220. The server computer may also send the encrypted server data to the client computer 220 at 207.

The client computer 220 may receive the blinded server public key from the server computer 260. The client computer 220 may also receive the encrypted server data. At 208, the client computer 220 may generate the first shared secret using the blinded server public key received from the server computer 260, the client private key 226, and the client blinding factor 228. The first shared secret generated by the client computer 220 may be the same as the first shared secret generated by the server computer 260. The client computer 220 may derive the first session key for encrypting data using the first shared secret. The first session key generated by the client computer 220 may be the same as the first session key generated by the server computer 260.

The client computer 220 may encrypt client data for the server computer 260 using the first session key derived from the first shared secret to obtain encrypted client data. For example, the client data may include the client certificate including the client public key 224. The client computer 220 may send the client certificate to the server computer 260 to enable the server computer 260 to authenticate the client computer 220 The client computer 220 may send the encrypted client data to the server computer 260.

The message flow of FIG. 2 enables the client computer and the server computer to establish communications in a such a manner that the identity of both the client computer 220 and the server computer 260 are kept confidential (i.e., the communications are dually confidential). The client computer 220 and the server computer 260 may generate different blinding factors, and different corresponding blinded public keys, to be used for different communications. The client computer 220 and the server computer 260 may encrypt further communications for each other using the first session key derived from the first shared secret.

III. Mutual Authentication

A first computer and a second computer use the confidential communications described above to provide authentication information to one another in order to mutually authenticate each other.

Figure 3:
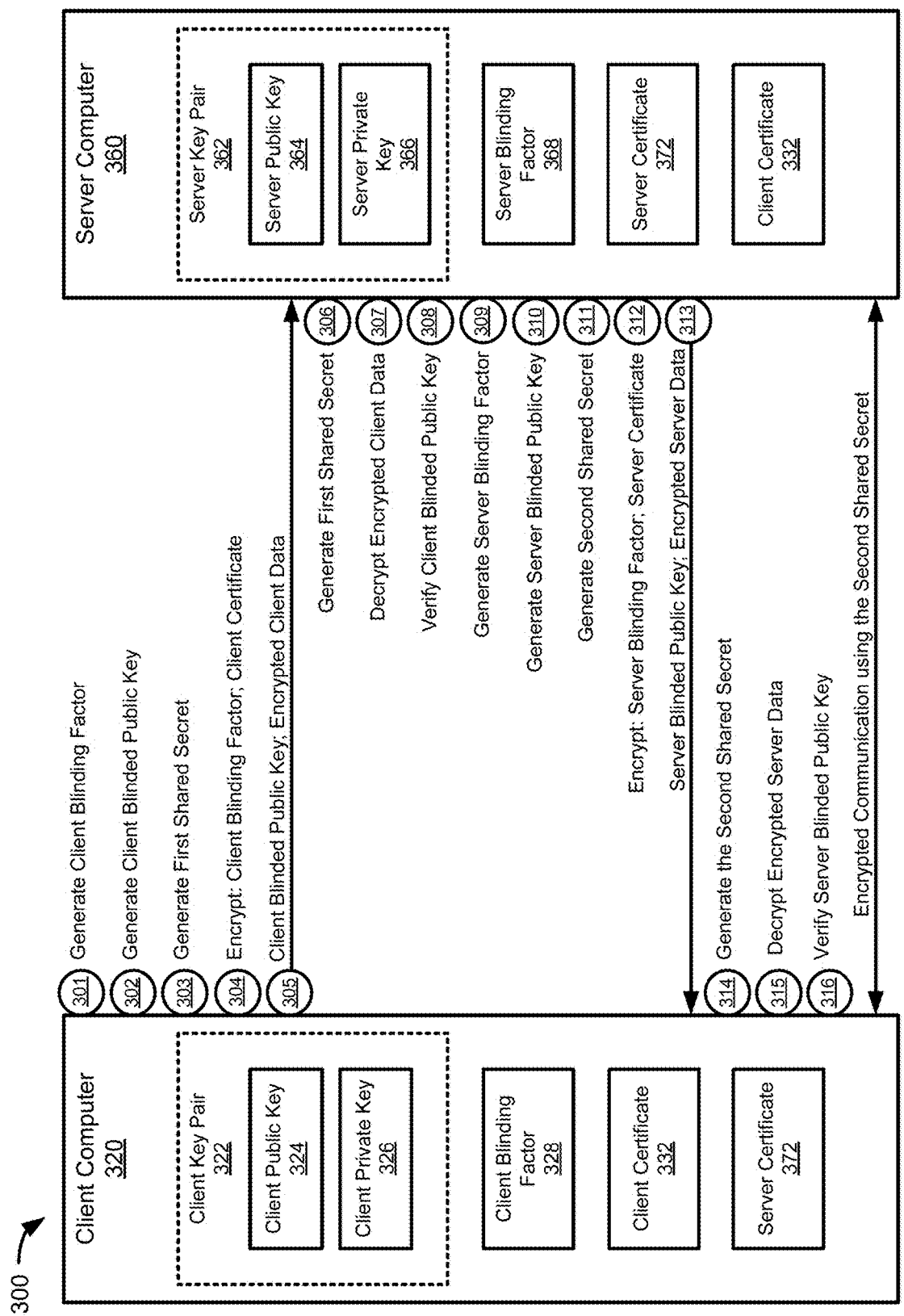
FIG. 3 shows a message flow diagram of a client computer and a server computer establishing dually confidential communications based on mutual authentication, in accordance with some embodiments.

FIG. 3 shows a message flow diagram 300 of a client computer 320 and a server computer 340 using dually confidential communications to establish mutual authentication, in accordance with some embodiments. The message flow diagram 300 may be used between any first computer and any second computer. The client/server distinction of FIG. 3 is exemplary and made to improve readability. In some embodiments, the client computer 320 may perform the operations described as being performed by the server computer 360. In some embodiments, the server computer 360 may perform the operations described as being performed by the client computer 320.

Prior to the message flow, the client computer 320 may store a client key pair 322 including a client public key 324 and a client private key 326 corresponding to the client public key 324. The client key pair 322 may be a static key pair. The client computer 220 may also store a client certificate 332 including the client public key 324. The client computer 320 may also store a server certificate 372 including a server public key 364. The client computer 320 may have previously obtained the server certificate 372 through an initialization process. Prior to the message flow, the server computer 360 may store a server key pair 362 including the server public key 364 and a server private key 366 corresponding to the server public key 364. The server key pair 362 may be a static key pair. The server computer 360 may also store the server certificate 372 including the server public key 364. The server computer 360 may also store the client certificate 332 including the client public key 324. The server computer 360 may have previously obtained the client certificate 332 through an initialization process.

At 301, the client computer 320 may generate a client blinding factor 328. The client blinding factor 328 may be a cryptographic nonce. A client blinding factor bit-length of the client blinding factor 328 may be shorter than a client public key bit-length of the client public key 324. At 302, the client computer 320 may generate a client blinded public key using the client public key 324 and the client blinding factor 328. For example, the client computer 320 may perform a multiplication operation on the client public key 324 and the client blinding factor 328 to obtain the client blinded public key.

At 303, the client computer 320 may generate a first shared secret using the client blinding factor 328, the client private key 326, and the server public key 364 of the server certificate 372. The client computer 320 may derive a first session key for encrypting data using the first shared secret. At 304, the client computer 320 may encrypt client data for the server computer using the first session key. At 304, in some embodiments, the client computer 320 may encrypt the client blinding factor 328 using the first session key derived from the first shared secret to obtain an encrypted client blinding factor. At 304, in some embodiments, the client computer 320 may also encrypt the client certificate 332 using the first session key derived from the first shared secret to obtain an encrypted client certificate. At 304, in some embodiments, the client computer 320 may also encrypt the client public key 324 to obtain an encrypted client public key. In some embodiments, the client computer 320 may sign the client data using the client private key 326 to obtain a signature and the client computer 320 may encrypt the signature using the first shared secret to obtain an encrypted certificate. At 305, the client computer may send the client blinded public key and encrypted client data to the server computer. The encrypted client data may include one or more of the encrypted client blinding factor, and the encrypted client certificate, the encrypted signature, and the encrypted client public key.

The server computer 360 may receive the client blinded public key and the encrypted client data from the client computer 320. At 306, the server computer 360 may generate the first shared secret using the client blinded public key and the server private key 366. The first shared secret generated by the server computer 360 may by the same as the first shared secret generated by the client computer 320. The server computer 360 may derive the first session key from the first shared secret. The first session key derived by the server computer 360 may be the same as the first session key derived by the client computer 320. At 307, the server computer 360 may decrypt the encrypted client data. In some embodiments, the server computer 360 may decrypt the encrypted blinding factor using the first session key to obtain the client blinding factor 328. In some embodiments, the server computer 360 may decrypt the encrypted client certificate using the first session key to obtain the client certificate 332. In some embodiments, the server computer 360 may decrypt the encrypted client public key using the first session key to obtain the client public key 324.

At 308, the server computer 360 may verify the client data. In some embodiments, the server computer 360 may verify the blinded client public key received from the client computer 320. The server computer 360 may verify the blinded client public key by generating a generated blinded client public key using the client public key 324 of the client certificate 332 and the client blinding factor 328 and comparing the generated client blinded public key to the client blinded public key received from the client computer 320. The server computer 360 may authenticate the client computer 320 based on verifying the client blinded public key.

In some embodiments, the server computer 360 may verify that the client public key received from the client computer corresponds to a client public key stored at the server computer or registered with the server computer. The server computer 360 may authenticate the client computer 320 based on verifying the client public key.

In some embodiments, the server computer 360 may verify the client certificate received from the client computer 320. In some embodiments, the server computer 360 may verify the client certificate received from the client computer 320 using a client public key 324 stored at the server computer 360 or registered with the server computer 360. The server computer 360 may authenticate the client computer 320 based on verifying the client certificate.

At 309, in response to authenticating the client computer 320, the server computer 360 may generate a server blinding factor 368. The server blinding factor 368 may be a cryptographic nonce. A server blinding factor bit-length of the server blinding factor 368 may be shorter than a server public key bit-length of the server public key 364. At 310, the server computer 360 may generate a server blinded public key using the server public key 364 and the server blinding factor 368. For example, the server computer 360 may perform a multiplication operation on the server public key 364 and the server blinding factor 368 to obtain the server blinded public key.

At 311, the server computer 360 may generate a second shared secret using the client blinded public key, the server private key 366, and the server blinding factor 368. The second shared secret may be different than the first shared secret. The server computer 360 may derive a second session key for encrypting data using the second shared secret. At 312, the server computer 360 encrypt server data for the client computer 320 using the second shared secret (e.g., using the second session key derived from the second shared secret). In some embodiments, the server computer 360 may encrypt the server blinding factor 368 using the second session key to obtain an encrypted server blinding factor. In some embodiments, the server computer 360 may encrypt the server certificate 372 using the second shared secret to obtain an encrypted server certificate. In some embodiments, the server computer 360 may sign the server data using the server private key 366 to obtain a signature and the server computer 360 may encrypt the signature using the second shared secret to obtain an encrypted signature. In some embodiments, the server computer 360 may encrypt the server public key 364 using the second shared secret to obtain an encrypted server public key.

At 313, the server computer 360 may send the server blinded public key and the encrypted server data to the client computer 320. The encrypted server data may include one or more of the encrypted server blinding factor, the encrypted signature, the encrypted server certificate, and the encrypted server public key.

The client computer 320 may receive the server blinded public key and the encrypted server data from the server computer 360. At 314, the client computer 320 may generate the second shared secret using the client private key 326, the client blinding factor 328, and the server blinded public key. The second shared secret generated by the client computer 320 may be the same as the second shared secret generated by the server computer 360. The client computer 320 may derive the second session key using the second shared secret. The second session key generated by the client computer 320 may be the same as the second session key generated by the server computer 360.

At 315, the client computer 320 may decrypt the encrypted server data using the second shared secret (e.g., using the second session key derived from the second session key) to obtain the server data for the client computer. The server data may include one or more of the server blinding factor 368, the server certificate 372, and the server public key 364.

At 316, the client computer 320 may verify the server data. In some embodiments, the client computer 320 may verify the blinded server public key received from the server computer 360. The client computer 320 may verify the blinded server public key by generating a generated blinded server public key using the server public key 364 or the server certificate 372 and the server blinding factor 368 and comparing the generated server blinded public key to the server blinded public key received from the server computer 360. The client computer 320 may authenticate the server computer 360 based on verifying the server blinded public key.

In some embodiments, the client computer 320 may verify that the server public key received from the server computer 360 corresponds to a server public key stored at the client computer or registered with the client computer. The client computer 320 may authenticate the server computer 360 based on verifying the server public key.

In some embodiments, the client computer 320 may verify the server certificate received from the server computer 360. In some embodiments, the client computer 320 may verify the server certificate received from the server computer 360 using a server public key stored at the client computer 320 or registered with the client computer 320. The client computer 320 may authenticate the server computer 360 based on verifying the server certificate.

As such, the client computer 320 and the server computer 360 may mutually authenticate each other using a single confidential communication from the client computer 320 to the server computer 360 (e.g., the communication at 305) and a single confidential communication from the server computer 360 to the client computer 320 (e.g., the communication at 313). The client computer 320 and the server computer 360 may encrypt further communications for each other using the second session key derived from the second shared secret.

A. Initialization for Authentication

Figure 4:
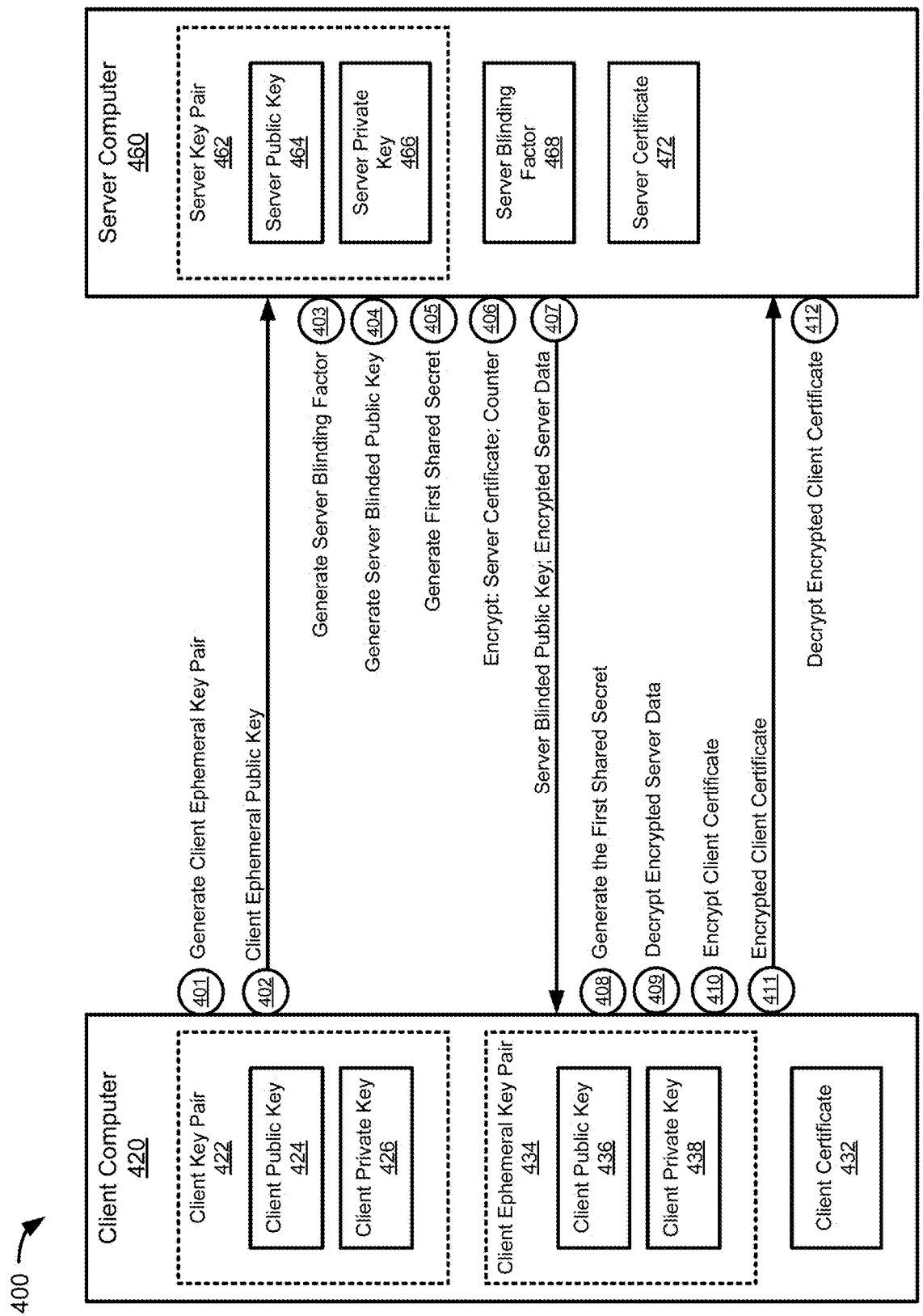
FIG. 4 shows a message flow diagram of a client computer and a server computer confidentially exchanging certificates for use in mutual authentication, in accordance with some embodiments.

FIG. 4 shows a message flow diagram 400 of a client computer 420 and a server computer 460 confidentially exchanging certificates for use in mutual authentication, in accordance with some embodiments. The message flow diagram 400 may be used between any first computer and any second computer. The client/server distinction is of FIG. 4 is exemplary and made to improve readability. In some embodiments, the client computer 420 may perform the operations described as being performed by the server computer 460. In some embodiments, the server computer 460 may perform the operations described as being performed by the client computer 420.

Prior to the message flow, the client computer 420 may store a client certificate 432 and the server computer 460 may store a server certificate 472. While the message flow diagram of FIG. 2 may enable a client computer and a server computer to exchange messages, the message flow diagram 400 of FIG. 4 provides another exemplary message flow for exchanging certificates. The certificate exchange of FIG. 4 may be part of an initialization process occurring before a mutual authentication process.

Prior to the message flow, the client computer 420 may store a client key pair 422 including a client public key 424 and a client private key 426 corresponding to the client public key 424. The client computer 420 may also store the client certificate 432 including the client public key 424. Prior to the message flow, the server computer 460 may store a server key pair 462 including a server public key 464 and a server private key 466 corresponding to the server public key 464. The server computer 460 may also store the server certificate 472 including the server public key 464.

At 401, the client computer 420 may generate a client ephemeral key pair 434 including a client ephemeral public key 436 and a client ephemeral private key 438 corresponding to the client ephemeral public key 436. At 402, the client computer 420 may send the client ephemeral public key 436 to the server computer 460 (e.g., over a network). The server computer 460 may receive the client ephemeral public key 436 from the client computer 420.

At 403, in response to receiving the client ephemeral public key 436, the server computer 460 may generate a server blinding factor 468. The server blinding factor 468 may be a cryptographic nonce. A server blinding factor bit-length of the server blinding factor 468 may be shorter than a server public key bit-length of the server public key 464. At 404, the server computer 460 may generate a server blinded public key using the server public key 464 and the server blinding factor 468. For example, the server computer 460 may perform a multiplication operation on the server public key 464 and the server blinding factor 468 to obtain the server blinded public key.

At 405, the server computer 460 may generate a first shared secret using the client blinded public key, the server private key 466, and the server blinding factor 468. The server computer 460 may derive a first session key for encrypting data using the first shared secret. At 406, the server computer 460 may encrypt the server data for the client computer 420 using the first shared secret (e.g., using the first session key derived from the first shared secret). In some embodiments, the server computer 460 may encrypt the server blinding factor 468 using the first shared secret (e.g., using the first session key derived from the first shared secret) to obtain an encrypted server blinding factor. In some embodiments, the server computer 460 may encrypt the server certificate 472 using the first shared secret to obtain an encrypted server certificate. In some embodiments, the server computer 460 may encrypt a counter using the first shared secret to obtain an encrypted counter. The encrypted server data may include one or more of the encrypted server certificate, the encrypted server blinding factor, and the encrypted counter. At 407, the server computer 460 may send the server blinded public key and encrypted server data to the client computer 420.

The client computer 420 may receive the server blinded public key and the encrypted server data from the server computer 460. At 408, the client computer 420 may generate the first shared secret using the server blinded public key and the client private key 426. The first shared secret generated by the client computer 420 may be the same as the first shared secret generated by the server computer 460. The client computer 420 may derive the first session key for encrypting data using the first shared secret. The first session key generated by the client computer 420 may be the same as the first session key generated by the server computer 460. At 409, the client computer 420 may decrypt the encrypted server data using the first shared secret (e.g., using the first session key derived from the first shared secret). In some embodiments, the client computer 420 may decrypt the encrypted server blinding factor using the first shared secret (e.g., using the first session key derived from the first shared secret) to obtain the server blinding factor. In some embodiments, the client computer 420 may decrypt the encrypted server certificate using the first shared secret to obtain the server certificate. In some embodiments, the client computer 420 may decrypt the encrypted counter using the first shared secret to obtain the counter. The client computer 420 may store the server data received from the server computer. In some embodiments, the client computer 420 may verify the server data.

At 410, the client computer 420 may encrypt the client certificate 432 using the first shared secret to obtain an encrypted client certificate. At 411, the client computer 420 may send the encrypted client certificate to the server computer 460.

As such, the client computer 420 and the server computer 460 may confidentially exchange certificates to be stored at the respective computers. This process may be generally referred to as an initialization process since the client computer 420 and the server computer 460 may perform the mutual authentication process of FIG. 3 after performing the process of FIG. 4.

B. Mutual Authentication Using a Time Stamp Counter

The mutual authentication processes describe above may be modified to include verification of additional information. For example, the mutual authentication may be based on a time stamp or a counter. The counter may be stored at the first computer and at the second computer.

Figure 5:
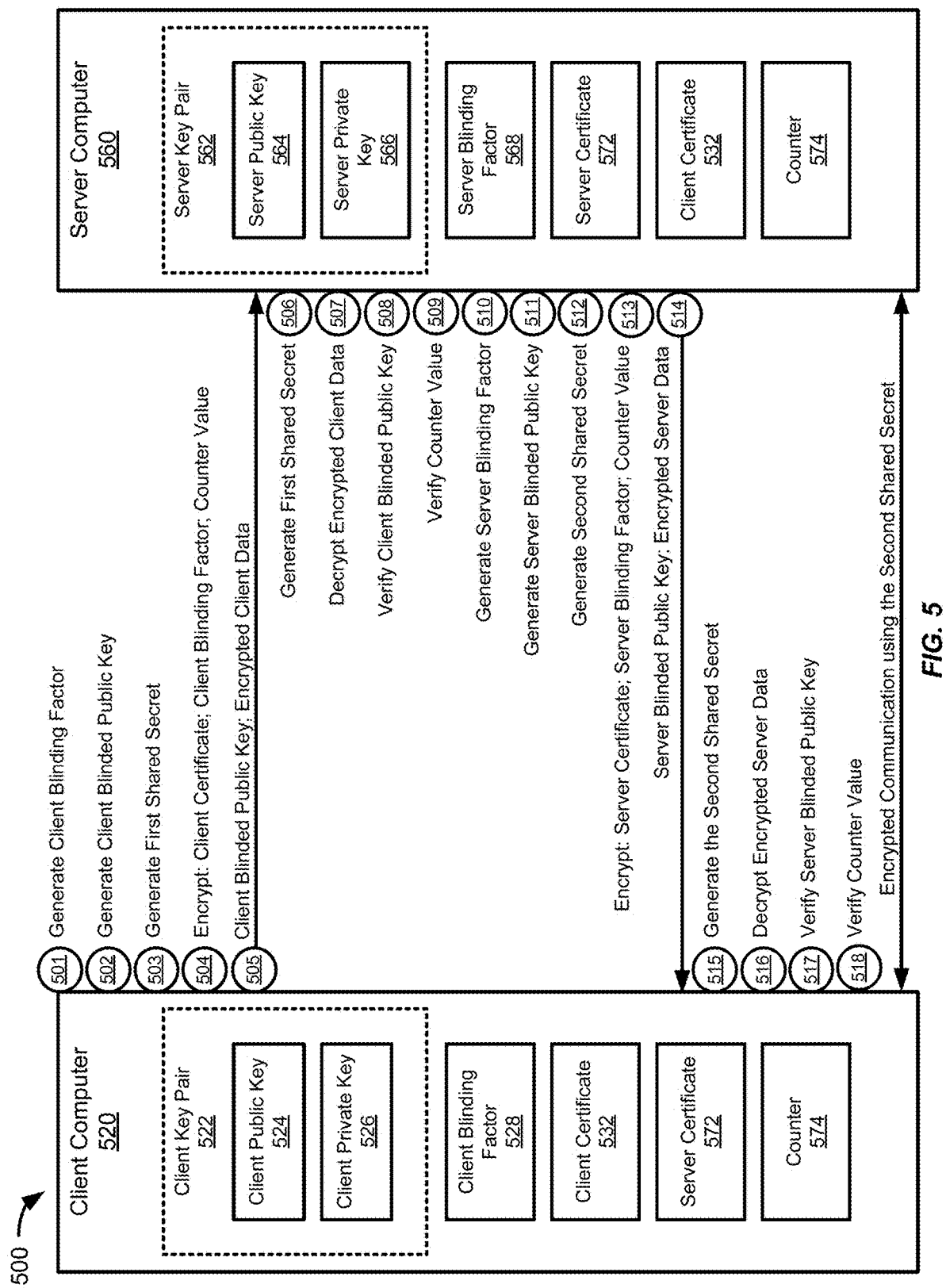
FIG. 5 shows a message flow diagram of a client computer and a server computer performing dually confidential mutual authentication using a stored counter, in accordance with some embodiments.

FIG. 5 shows a message flow diagram 500 of a client computer 520 and a server computer 560 performing dually confidential mutual authentication using a timestamp or a stored counter, in accordance with some embodiments. The message flow diagram of FIG. 5 may be used between any first computer and any second computer. The client/server distinction is of FIG. 5 is exemplary and made to improve readability. In some embodiments, the client computer 520 may perform the operations described as being performed by the server computer 560. In some embodiments, the server computer 560 may perform the operations described as being performed by the client computer 520.

Prior to the message flow, the client computer 520 may store a client key pair 522 including a client public key 524 and a client private key 526 corresponding to the client public key 524. The client key pair 522 may be a static key pair. The client computer 520 may also store a client certificate 532 including the client public key 562. The client computer may also store a server certificate 572 including a server public key 564. The client computer 520 may have previously obtained the server certificate 572 using the process described above with reference to FIG. 2 or the initialization process described above with respect to FIG. 4.

The client computer 520 may also store a counter 574. In some embodiments, the counter 574 may be a time counter or a clock. In some embodiments, the client computer 520 may have obtained the counter 574 from the server computer 560 using the process described above with reference to FIG. 2 or the initialization process described above with respect to FIG. 4. The client computer 520 may establish the counter 574 with the server computer 560 such that a counter value of the counter 574 at the client computer 520 is the same as, or sufficiently close to, the counter value of the counter 574 stored at the server computer 560. In embodiments where the counter 574 is a time counter, the counter value of the counter 574 may be a time stamp. In some embodiments, the counter 574 may be a numerical counter that increments by a variable value or by a fixed value after a certain condition has occurred (e.g., after a certain amount of time has passed or after a certain number of transmissions have been sent or received).

The server computer 560 may store a server key pair 562 including the server public key 564 and a server private key 566 corresponding to the server public key 564. The server computer 560 may also store the server certificate 572 including the server public key 564. The server computer 560 may also store the client certificate 532 including the client public key 524. The server computer 560 may have previously obtained the client certificate 532 through an initialization process, as described above.

The server computer 560 may also store the counter 574. In some embodiments, the counter 574 may be a time counter or a clock. In some embodiments, the server computer 560 may have obtained the counter 574 from the client computer 520 using the process described above with reference to FIG. 2 or the initialization process described above with respect to FIG. 4. The server computer 560 may establish the counter 574 with the client computer 520 such that a counter value of the counter 574 at the server computer 560 is the same as, or sufficiently close to, the counter value of the counter 574 stored at the client computer 520. In embodiments where the counter 574 is a time counter, the counter value of the counter 574 may be a time stamp. In some embodiments, the counter 574 may be a numerical counter that increments by a variable value or by a fixed value after a certain condition has occurred (e.g., after a certain amount of time has passed or after a certain number of transmissions have been sent or received).

At 501, the client computer 520 may generate a client blinding factor 528. The client blinding factor 528 may be a cryptographic nonce. In some embodiments, the client computer 520 may generate the client blinding factor 528 based on a counter value of the counter 574. A client blinding factor bit-length of the client blinding factor may be shorter than a client public key bit-length of the client public key. At 502, the client computer 520 may generate a client blinded public key using the client public key 524 and the client blinding factor 528. For example, the client computer 520 may perform a multiplication operation on the client public key 524 and the client blinding factor 528. In some embodiments, where the client blinding factor 528 is based on the counter value, the client computer 520 may determine a client blinding factor remainder based on the client blinding factor 528 and the counter value. Accordingly, the client blinding factor 528 may be determined based on the client blinding factor remainder and the counter value.

At 503, the client computer 520 may generate a first shared secret using the client blinding factor 528, the client private key 526, and the server public key 564 of the stored server certificate 572. The client computer 520 may derive a first session key for encrypting data using the first shared secret.

At 504, the client computer 520 may encrypt client data using the first shared secret. In some embodiments, the client computer 520 may encrypt the client blinding factor 528 using the first shared secret to obtain an encrypted client blinding factor. In some embodiments, the client computer 520 may encrypt may encrypt the client certificate 532 using the first shared secret to obtain an encrypted client certificate. In some embodiments, the client computer 520 may encrypt the counter value using the first shared secret to obtain an encrypted counter value. In some embodiments, the client computer 520 may encrypt the client public key 524 using the first shared secret to obtain an encrypted client public key. In some embodiments, the client computer 520 may sign the client data and encrypt the signature using the first shared secret to obtain an encrypted signature. In some embodiments, where the client blinding factor is based on the counter value, the client computer 520 may also encrypt the client blinding factor remainder using the first shared secret to obtain an encrypted client blinding factor remainder.

At 505, the client computer 520 may send the client blinded public key encrypted client data to the server computer 560. The encrypted client data may include one or more of the encrypted client blinding factor, the encrypted counter value, and the encrypted client certificate, the encrypted client public key, the encrypted signature, and the encrypted client blinding factor remainder. At 505, in some embodiments, the encrypted client data sent to the server computer may include the encrypted client blinding factor remainder but not the encrypted client blinding factor or the encrypted counter value.

The server computer 560 may receive the client blinded public key and the encrypted client data from the client computer 520. At 506, the server computer 560 may generate the first shared secret using the client blinded public key and the server private key 566. The first shared secret generated by the server computer 560 may by the same as the first shared secret generated by the client computer 520. The server computer 560 may derive the first session key from the first shared secret. The first session key derived by the server computer 560 may be the same as the first session key derived by the client computer 520. At 507, the server computer 560 may decrypt the encrypted client data using the first session key. In some embodiments, the server computer may decrypt the encrypted client blinding factor using the first shared secret to obtain the client blinding factor. In some embodiments, the server computer may decrypt the encrypted counter value using the first shared secret to obtain the counter value. In some embodiments, the server computer may decrypt the encrypted client certificate using the first shared secret to obtain the client certificate. In some embodiments, the server computer may decrypt the encrypted client public key using the first shared secret to obtain the client public key 524. In some embodiments, the server computer may decrypt the encrypted client blinding factor remainder using the first shared secret to obtain the client blinding factor remainder.

At 508, the server computer 560 may verify the blinded client public key received from the client computer 520. The server computer 560 may verify the blinded client public key by generating a generated blinded client public key using the client public key 524 (e.g., the client public key 524 of the client certificate 532) and the client blinding factor 528 and comparing the generated client blinded public key to the client blinded public key received from the client computer 520. In some embodiments, the server computer 560 may generate the generated blinded client public key using the client public key 524, the client blinding factor remainder, and a counter value of the counter stored at the server computer 560. The server computer 560 may authenticate the client computer 520 based on verifying the client blinded public key. At 509, the server computer 560 may verify the counter value received from the client computer 520 by comparing it to the counter value of the counter stored at the server computer 560. The server computer 560 may authenticate the client computer 520 based on verifying the counter value received from the client.

At 510, in response to authenticating the client computer 520, the server computer 560 may generate a server blinding factor 568. The server blinding factor 568 may be a cryptographic nonce. In some embodiments, the server computer 560 may generated the server blinding factor 568 based on the counter value of the counter stored at the server computer 560. A server blinding factor bit-length of the server blinding factor 568 may be shorter than a server public key bit-length of the server public key 564. At 511, the server computer 560 may generate a server blinded public key using the server public key 564 and the server blinding factor 568. For example, the server computer 560 may perform a multiplication operation on the server public key 564 and the server blinding factor 468. In some embodiments, where the server blinding factor 568 is based on the counter value, the server computer 560 may determine a server blinding factor remainder based on the server blinding factor 568 and the counter value. Accordingly, the server blinding factor 568 may be determined based on the server blinding factor remainder and the counter value.

At 512, the server computer 560 may generate a second shared secret using the client blinded public key, the server private key 566, and the server blinding factor 568. The second shared secret may be different than the first shared secret. The server computer 560 may derive a second session key for encrypting data using the second shared secret. At 512, the server computer 560 may encrypt server data using the second shared secret to obtain encrypted server data. In some embodiments, the server computer 560 may encrypt the server blinding factor 568 using the second session key to obtain an encrypted server blinding factor. In some embodiments, the server computer 560 may encrypt the server blinding factor 568 using the second session key derived from the second shared secret to obtain an encrypted server blinding factor. In some embodiments, the server computer 560 may encrypt the server certificate 572 using the second session key derived from the second shared secret to obtain an encrypted server certificate. In some embodiments, the server computer 560 may encrypt the counter value of the counter stored at the server computer 560 using the second session key derived from the second shared secret to obtain an encrypted counter value. In some embodiments, the server computer 560 may encrypt the server public key 564 using the second shared secret to obtain an encrypted server public key. In some embodiments, the server computer 560 encrypt the server blinding factor remainder to obtain an encrypted server blinding factor remainder. In some embodiments, the server computer 560 may sign the server data and encrypt the signature using the second shared secret to obtain an encrypted signature.

At 514, the server computer 560 may send the server blinded public key and encrypted server data to the client computer 520. The encrypted server data may include one or more of the encrypted client blinding factor, the encrypted counter value, the encrypted signature, the encrypted server public key, and the encrypted client certificate. In some embodiments, the encrypted server data sent to the client computer 520 may include the encrypted server blinding factor remainder but not the encrypted server blinding factor or the encrypted counter value.

The client computer 520 may receive the server blinded public key and the encrypted server data from the server computer 560. At 515, the client computer 520 may generate the second shared secret using the client private key, the client blinding factor 528, and the server blinded public key. The second shared secret generated by the client computer 520 may be the same as the second shared secret generated by the server computer 560. The client computer 520 may derive the second session key for encrypting data using the second shared secret. The second session key generated by the client computer 520 may be the same as the second session key generated by the server computer 560.

At 516, the client computer 520 may decrypt the encrypted server data using the second shared secret (e.g., using the second session key derived from the second shared secret). In some embodiments, at 513, the client computer 520 may decrypt the encrypted server blinding factor using the second shared secret to obtain the server blinding factor. In some embodiments, at 513, the client computer 520 may decrypt the encrypted server public key using the second shared secret to obtain the server public key 564. In some embodiments, at 513, the client computer 520 may decrypt the encrypted signature using the second shared secret to obtain the signature. In some embodiments, at 513, the client computer 520 may decrypt the encrypted server certificate using the second shared secret to obtain the server certificate. In some embodiments, at 513, the client computer 520 may decrypt the encrypted counter value using the second shared secret to obtain the counter value of the server computer. In embodiments, the client computer 520 may decrypt the encrypted server blinding factor remainder using the second shared secret to obtain the server blinding factor remainder.

At 517, the client computer 520 may verify the blinded server public key received from the server computer 560. The client computer 520 may verify the blinded server public key by generating a generated blinded server public key using the server public key 564 (e.g., of the server certificate 572) and the server blinding factor 568 and comparing the generated server blinded public key to the server blinded public key received from the server computer 560. The client computer may authenticate the server computer based on verifying the server blinded public key. In some embodiments, the client computer may verify the signature using the server public key 564. The client computer 520 may authenticate the server computer 560 based on the verification of the signature. In some embodiments, the client computer 520 may generate the generated blinded server public key using the server public key 564 (e.g., of the server certificate), the server blinding factor remainder, and the counter value of the counter stored at the client computer 520.

In some embodiments, at 518, the client computer 520 may verify the counter value received from the server computer 560 by comparing it to the counter value of the counter stored at the client computer 520. The client computer 520 may authenticate the server computer 560 based on verifying the counter value received from the server computer.

As such, the client computer 520 and the server computer 560 may mutually authenticated each other based on the information received through confidential communications. In particular, the client computer 520 and the server computer 560 may mutually authenticate one another using the only the communication sent from the client computer 520 to the server computer 560 at 505 and the communication sent from the server computer 560 to the client computer 520 at 514. The client computer and the server computer may encrypt further communications for each other using the second shared secret.

C. Authentication Using a Challenge

Figure 6:
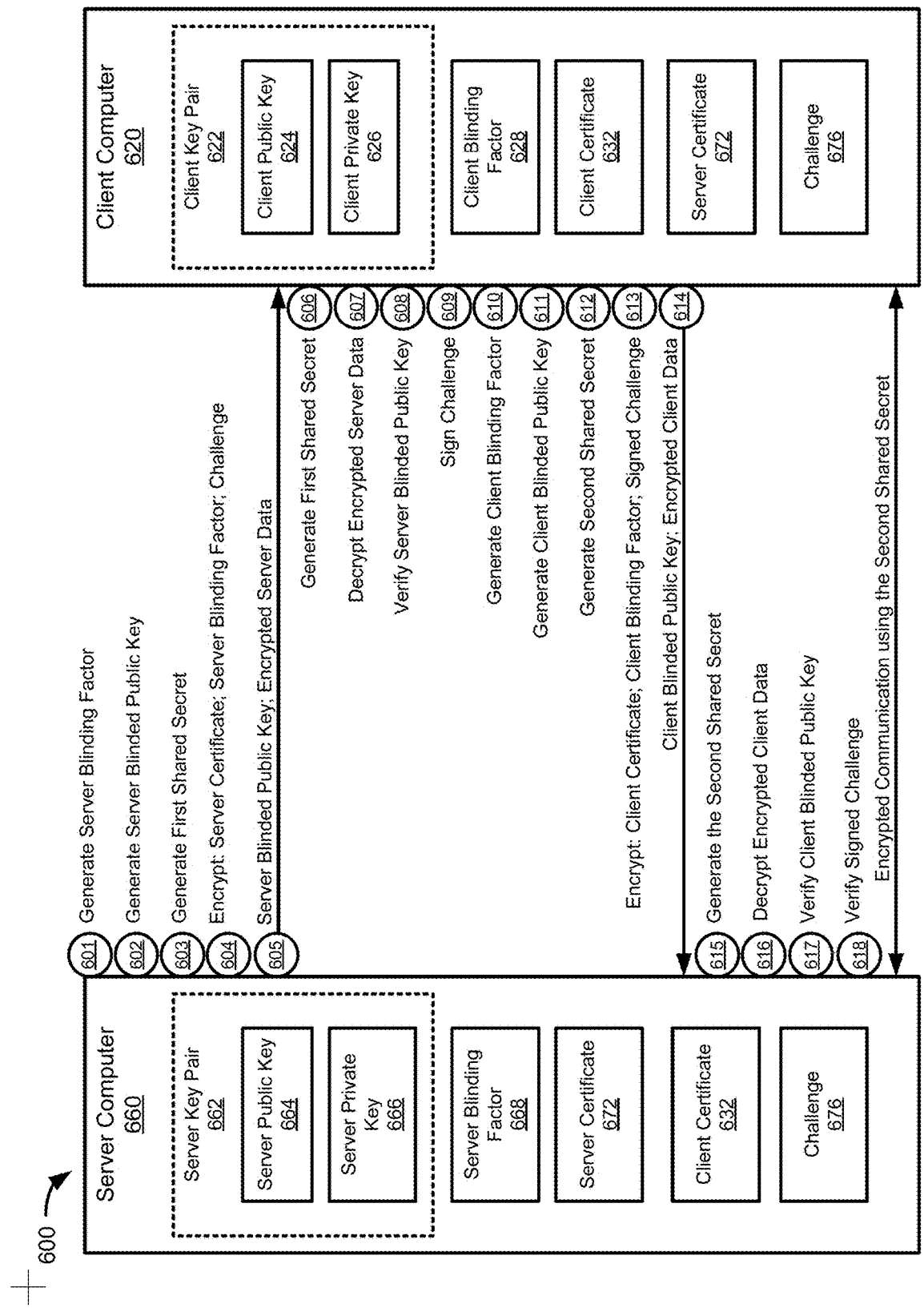
FIG. 6 shows a message flow diagram of a client computer and a server computer performing dually confidential mutual authentication using a challenge, in accordance with some embodiments.

FIG. 6 shows a message flow diagram 600 of a client computer 620 and a server computer 660 performing dually confidential mutual authentication using a challenge, in accordance with some embodiments. The message flow diagram 600 may be used between any first computer and any second computer. The client/server distinction is of FIG. 6 is exemplary and made to improve readability. In some embodiments, the client computer 620 may perform the operations described as being performed by the server computer 660. In some embodiments, the server computer 660 may perform the operations described as being performed by the client computer 620.

Prior to the message flow, the client computer 620 may store a client key pair 622 including a client public key 624 and a client private key 626 corresponding to the client public key 624. The client key pair 622 may be a static key pair. The client computer 620 may also store a client certificate 632 including the client public key 624. The client computer 620 may also store a server certificate including a server public key. The client computer may have previously obtained the server certificate 672 obtained using the process described above with reference to FIG. 2 or the initialization process described above with respect to FIG. 4.

Prior to the message flow, the server computer 560 may store a server key pair 662 including a server public key 664 and a server private key 666 corresponding to the server public key 664. The server computer 660 may also store the server certificate 672 including the server public key 664. The server computer 660 may also store the client certificate 632 including the client public key 624. The server computer 660 may have previously obtained the client certificate 632 through an initialization process.

At 601, the server computer 660 may generate a server blinding factor 668. The server blinding factor 668 may be a cryptographic nonce. A server blinding factor bit-length of the server blinding factor 668 may be shorter than a server public key bit-length of the server public key 664. At 602, the server computer 660 may generate a server blinded public key using the server public key 664 and the server blinding factor 668. For example, the server computer 660 may perform a multiplication operation on the server public key 664 and the server blinding factor 668 to obtain the serer blinded public key.

At 603, the server computer 660 may generate a first shared secret using the server blinding factor 668, the server private key 666, and the client public key 624 (e.g., of the client certificate 632). The server computer 660 may derive a first session key for encrypting data using the first shared secret. At 604, the server computer may encrypt server data for the client computer using the first session key. In some embodiments, the server computer 660 may encrypt the server blinding factor 668 using the first shared secret (e.g., using the first session key derived from the first shared secret) to obtain an encrypted server blinding factor. In some embodiments, the server computer 660 may encrypt the server certificate 672 using the first shared secret to obtain an encrypted server certificate. In some embodiments, the server computer 660 may encrypt the server public key 664 using the first shared secret to obtain an encrypted server public key. In some embodiments, the server computer 660, may generated a challenge to use for authentication of the client computer 620 and encrypt the challenge using the first shared secret to obtain an encrypted challenge. At 605, the server computer may send the server blinded public key and encrypted server data to the client computer 620. The encrypted server data may include one or more of the encrypted server blinding factor, the encrypted server certificate, the encrypted server public key, the encrypted signature, and the encrypted challenge to the client computer.

The client computer 620 may receive the server blinded public key and the encrypted server data from the server computer 660. At 606, the client computer 620 may generate the first shared secret using the server blinded public key and the client private key 626. The first shared secret generated by the client computer 620 may by the same as the first shared secret generated by the server computer 660. The client computer 620 may derive the first session key from the first shared secret. The first session key derived by the client computer 620 may be the same as the first session key derived by the server computer 660. At 607, the client computer 620 may decrypt the encrypted server data using the first shared secret (e.g., using the first session key derived from the first shared secret). In some embodiments, the client computer 620 may decrypt the encrypted server blinding factor using the first shared secret to obtain the server blinding factor. In some embodiments, the client computer 620 may decrypt the encrypted challenge using the first shared secret to obtain the challenge. In some embodiments, the client computer 620 may decrypt the encrypted server certificate using the first shared secret key to obtain the server certificate 672. In some embodiments, the client computer 620 may decrypt the encrypted server public key using the first shared secret key to obtain the server public key 664. In some embodiments, the client computer 620 may decrypt the encrypted signature using the first shared secret key to obtain the signature signed by the server computer 660.

At 608, the client computer 620 may verify the blinded server public key received from the server computer 660. The client computer 620 may verify the blinded server public key by generating a generated blinded server public key using the server public key 664 (e.g., of the server certificate 672) and the server blinding factor 668 and comparing the generated server blinded public key to the server blinded public key received from the server computer 660. The client computer 620 may authenticate the server computer 660 based on verifying the server blinded public key. The client computer 620 may also verify the signature signed by the server computer 660 using the server public key 664. the client computer 620 may authenticate the server based on verifying the signature.

At 609, in response to authenticating the server computer 660, the client computer 620 may sign the challenge received from the server computer 660 using the client private key 626.

At 610, the client computer 620 may generate a client blinding factor 628. The client blinding factor 628 may be a cryptographic nonce. A client blinding factor bit-length of the client blinding factor 628 may be shorter than a client public key bit-length of the client public key 624. At 611, the client computer 620 may generate a client blinded public key using the client public key 624 and the client blinding factor 628. For example, the client computer 620 may perform a multiplication operation on the client public key 624 and the client blinding factor 628.

At 612, the client computer 620 may generate a second shared secret using the server blinded public key, the client private key 626, and the client blinding factor 628. The second shared secret may be different than the first shared secret. The client computer 620 may derive a second session key for encrypting data using the second shared secret. The client computer 620 may encrypt client data using the second shared secret to obtain encrypted client data. In some embodiments, the client computer 620 may encrypt the client blinding factor 628 using the second shared secret to obtain an encrypted server blinding factor. In some embodiments, the client computer 620 may encrypt the client blinding factor 628 using the second shared secret to obtain an encrypted client blinding factor. In some embodiments, the client computer 620 may encrypt the client certificate 632 using the second shared secret to obtain an encrypted client certificate. In some embodiments, the client computer 620 may encrypt the client public key 624 using the second shared secret to obtain an encrypted client public key. In some embodiments, the client computer 620 may sign the client data using the client private key 626 to obtain a signature and the client computer may encrypt the signature using the second shared secret to obtain an encrypted signature. In some embodiments, the client computer 620 may encrypt the signed challenge using the second shared secret to obtain an encrypted signed challenge.

At 614, the client computer 620 may send the client blinded public key and the encrypted client data to the server computer 660. The encrypted client data may include one or more of the encrypted client blinding factor, the encrypted client certificate, the encrypted signature, the encrypted client public key, and the encrypted signed challenge.

The server computer 660 may receive the client blinded public key and the encrypted client data from the client computer 620. At 615, the server computer 660 may generate the second shared secret using the server private key 666, the server blinding factor 668, and the client blinded public key. The second shared secret generated by the server computer 660 may be the same as the second shared secret generated by the client computer 620. The server computer 660 may derive the second session key for encrypting data using the second shared secret. The second session key generated by the server computer 660 may be the same as the second session key generated by the client computer 620.

At 616, the server computer may decrypt the encrypted client data using the second shared secret (e.g., using the second session key derived from the second shared secret). In some embodiments, at 616, the server computer 660 may decrypt the encrypted client blinding factor using the second shared secret to obtain the client blinding factor. In some embodiments, at 616, the server computer 660 may decrypt the encrypted client certificate using the second shared secret to obtain the client certificate 632. In some embodiments, at 616, the server computer 660 may decrypt the encrypted signed challenge using the second shared secret to obtain the signed challenge. In some embodiments, at 616, the server computer 660 may decrypt the encrypted client public key using the second shared secret to obtain the client public key 624. In some embodiments, at 616, the server computer 660 may decrypt the encrypted signature using the second shared secret to obtain the signature generated by the client computer 620.

At 617, the server computer 660 may verify the blinded client public key received from the client computer 620. The server computer 660 may verify the blinded client public key by generating a generated blinded client public key using the client public key 624 (e.g., of the client certificate 632) and the client blinding factor 628 and comparing the generated client blinded public key to the client blinded public key received from the client computer 620. The server computer 660 may authenticate the client computer based on verifying the client blinded public key. In some embodiments, the server computer 660 may verify the signature using the client public key 624 and the server computer 660 may authenticate the client computer 620 based on verifying the signature.

At 618, the server computer 660 may verify the signed challenge. The server computer 660 may verify the signed challenge using the client public key 624 (e.g., of the client certificate). In some embodiments, the server computer 660 may verify the signed challenge based on the challenge generated by the server computer 660. The server computer 660 may authenticate the client computer 620 based on verifying the signed challenge.

As such, the client computer 620 and the server computer 660 may mutually authenticated each other based on the information received through confidential communications. In particular, the client computer 620 and the server computer 660 may mutually authenticate one another using the only the communication sent from the server computer 660 to the client computer 620 at 6505 and the communication sent from the client computer 620 to the server computer 660 at 614. The client computer 620 and the server computer 660 may encrypt further communications for each other using the second shared secret.

IV. Methods for Secure and Confidential Communication

Methods for secure and confidential communications are described below with reference to FIG. 7 and FIG. 8. The message flows described herein may incorporate these methods or a portion thereof.

A. Method for Confidentially Establishing a Shared Secret by a First Computer

Figure 7:
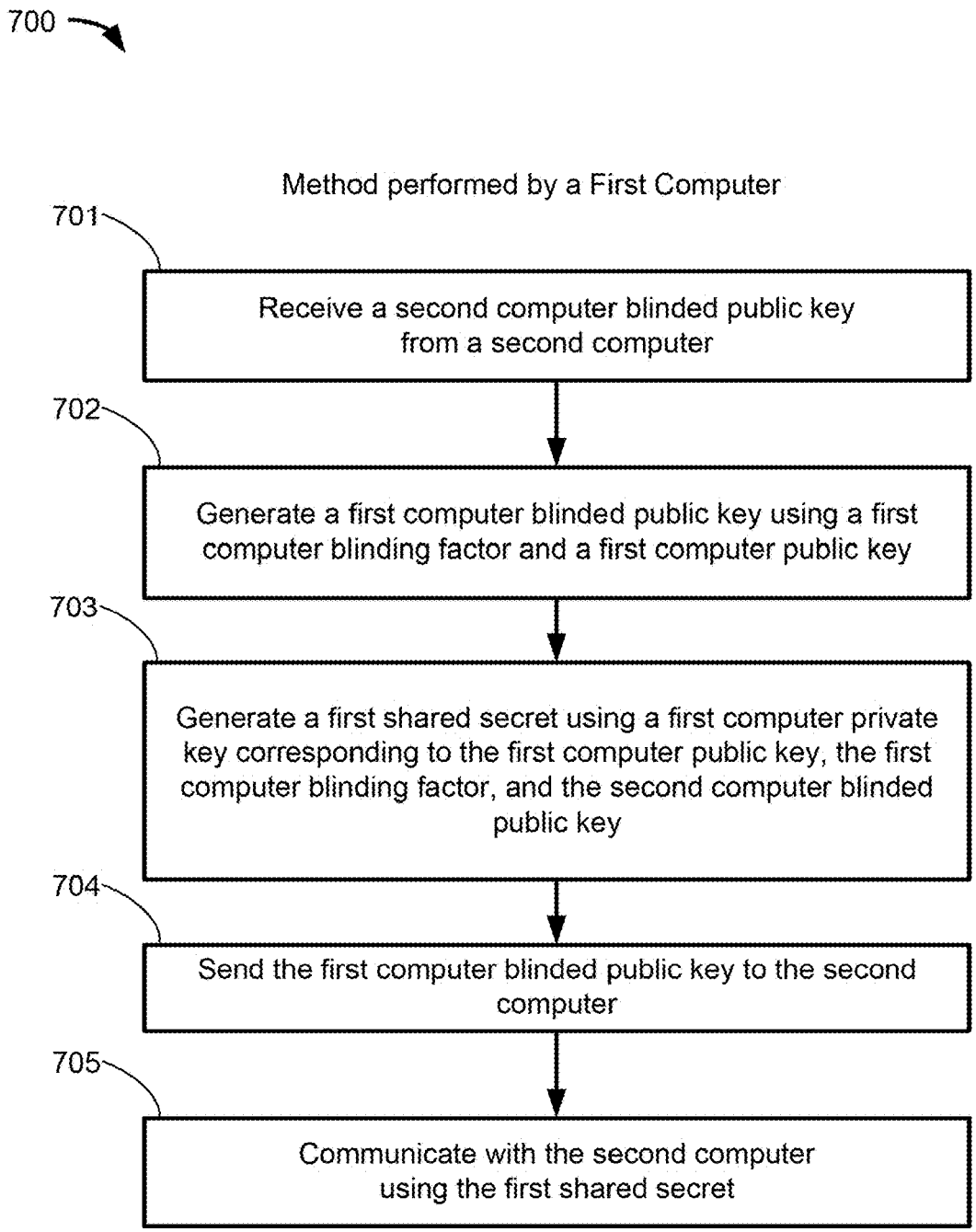
FIG. 7 shows a flowchart of a method performed by a first computer for establishing dually confidential communications with a second computer, in accordance with some embodiments.

FIG. 7 shows a flowchart 700 of a method performed by a first computer for establishing dually confidential communications with a second computer, in accordance with some embodiments. The first computer may operate similar to the client computer and/or the server computer described above. In some embodiments, the method of FIG. 7 may be performed by the server computer 260 of FIG. 2.

At 701, the first computer may receive a second computer blinded public key from a second computer. The second computer blinded public key may be received over an unsecured network. The second computer blinded public key may have been generated by the second computer using a second computer blinding factor and a second computer public key. The second computer public key may be a static public key of a static key pair. The second computer blinding factor may be a cryptographic nonce. The second computer may have generated the second computer blinded public key by multiplying the second computer public key by the second computer blinding factor. As such, the second computer public key is blinded by the second computer blinding factor, resulting in the second computer blinded public key. Since the second computer blinded public key is blinded, it may not be used to track the identity of the second computer since the second computer may use different blinding factors, and thus, different blinded public keys, to create different shared secrets for encrypting different communications.

At 702, the first computer may generate a first computer blinded public key using a first computer blinding factor and a first computer public key. The first computer public key may be a static public key of a static key pair. The first computer blinding factor may be a cryptographic nonce. The first computer may generate the first computer blinded public key by multiplying the first computer public key by the first computer blinding factor. As such, the first computer public key is blinded by the first computer blinding factor, resulting in the first computer blinded public key. Because the first computer blinded public key is blinded, it may not be used to track the identity of the second computer since the second computer may use different blinding factors, and thus, different blinded public keys, to create different shared secrets for encrypting different communications.

At 703, the first computer may generate a first shared secret using a first computer private key corresponding to the first computer public key, the first computer blinding factor, and the second computer blinded public key. The first computer may also derive a first session key for encrypting data using the first shared secret.

At 704 the first computer may send the first computer blinded public key to the second computer. As such, the second computer may generate the same first shared secret as generated by the first computer. The second computer may generate the first shared secret using the first computer blinded public key, the second computer blinding factor, and a second computer private key corresponding to the second computer public key. The second computer may also derive a first session key for encrypting data using the first shared secret.

At 705, the first computer may communicate with the second computer using the first shared secret. The first computer may encrypt communications using the first session key derived from the first shared secret. In some embodiments, the first computer may encrypt the first computer public key or a first computer certificate including the first computer public key and send the encrypted first computer public key or the encrypted first computer certificate to the second computer, thereby enabling the second computer to authenticate the first computer using an authentication process as described herein.

B. Method for Confidentially Establishing a Shared Secret by a Second Computer

FIG. 8 shows a flowchart 800 of a method performed by a second computer for establishing dually confidential communications with a first computer, in accordance with some embodiments. The second computer may operate similar to the client computer and/or the server computer described above. In some embodiments, the method of FIG. 8 may be performed by the client computer 220 of FIG. 2.

At 801, the second computer may generate a second computer blinded public using a second computer blinding factor and a second computer public key. The second computer may generate the second computer blinded public key using a second computer blinding factor and a second computer public key. The second computer public key may be a static public key of a static key pair. The second computer blinding factor may be a cryptographic nonce. The second computer may generate the second computer blinded public key by multiplying the second computer public key by the second computer blinding factor. As such, the second computer public key is blinded by the second computer blinding factor, resulting in the second computer blinded public key. Because the second computer blinded public key is blinded, it may not be used to track the identity of the second computer since the second computer may use different blinding factors, and thus, different blinded public keys, to create different shared secrets for encrypting different communications.

At 802, the second computer may send the second computer blinded public key to a first computer. The second computer may send the second computer blinded public key to the first computer over an unsecured network. The first computer may receive the second computer blinded public key from the second computer. The first computer may generate a first computer blinded public key using a first computer blinding factor and a first computer public key. The first computer public key may be a static public key of a static key pair. The first computer blinding factor may be a cryptographic nonce. The first computer may generate the first computer blinded public key by multiplying the first computer public key by the first computer blinding factor. The first computer may send the first computer blinded public key to the second computer over the unsecured network.

At 803, the second computer may receive a first computer blinded public key from the first computer. As discussed above, the first computer may generate the first computer blinded public key and sent it to the second computer.

At 804, the second computer may generate a first shared secret using the first computer blinded public key, the second computer blinding factor, and a second computer private key corresponding to the second computer public key. The second computer may also derive a first session key for encrypting data using the first shared secret. The first computer may generate the same first shared secret using the second computer blinded public key, the first computer blinding factor, and the first computer private key corresponding to the first computer public key. The first computer may also derive the first session key using the first shared secret.

At 805, the second computer may communicate with the first computer using the first shared secret. The second computer may encrypt communications using the first session key derived from the first shared secret. In some embodiments, the second computer may encrypt the second computer public key or a second computer certificate including the second computer public key and send the encrypted second computer public key or the encrypted second computer certificate to the first computer, thereby enabling the first computer to authenticate the second computer using an authentication process as described herein.

V. Methods for Secure and Confidential Mutual Authentication

Methods for secure and confidential mutual authentication are described below with reference to FIG. 9, FIG. 10, and FIG. 11. The message flows described herein may incorporate these methods or a portion thereof.

A. Method for Confidential Mutual Authentication Using a Certificate

Figure 9:
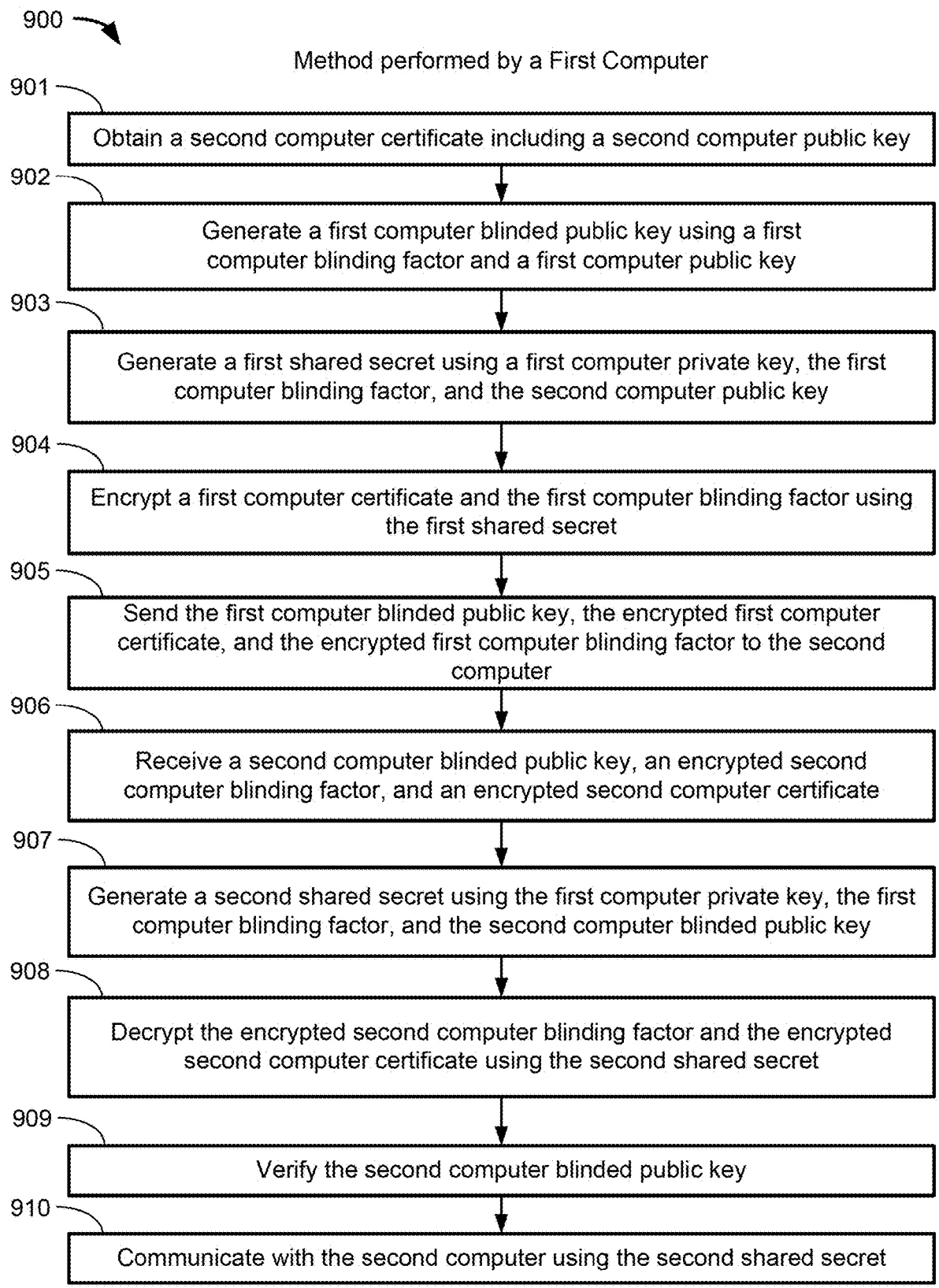
FIG. 9 shows a flowchart of a method performed by a first computer for performing mutual authentication with a second computer using dually confidential communications, in accordance with some embodiments.

FIG. 9 shows a flowchart of a method performed by a first computer for performing mutual authentication with a second computer using dually confidential communications, in accordance with some embodiments. The first computer may operate similar to the client computer and/or the server computer described above.

At 901, the first computer may obtain a second computer certificate including a second computer public key. The first computer may obtain the second computer certificate through an initialization process as described above. In some embodiments, the first computer may obtain just the second computer public key and not the second computer certificate.

At 902, the first computer may generate a first computer blinded public key using a first computer blinding factor and a first computer public key. The first computer blinding factor may be a cryptographic nonce. The first computer may perform a multiplication operation on the first computer public key and the first computer blinding factor to obtain the first computer blinded public key At 903, the first computer may generate a first shared secret using a first computer private key, the first computer blinding factor, and the second computer public key. The first computer may also derive a first session key for encrypting data using the first shared secret.

At 904, the first computer may encrypt a first computer certificate and the first computer blinding factor using the first shared secret. For example, the first computer may encrypt the first computer certificate and the first computer blinding factor using the first session key derived from the first shared secret.

At 905, the first computer may send the first computer blinded public key, the encrypted first computer certificate, and the encrypted first computer blinding factor to the second computer. The second computer may receive the first computer blinded public key, the encrypted first computer certificate, and the encrypted first computer blinding factor from the first computer.

At 906, the first computer may receive a second computer blinded public key, an encrypted second computer blinding factor, and an encrypted second computer certificate. The second computer may have encrypted the encrypted second computer blinding factor and the encrypted second computer certificate using a second shared secret. The second computer may have generated the second shared secret using a second computer private key, a second computer blinding factor, and the first computer blinded public key.

At 907, the first computer may generate the second shared secret using the first computer private key, the first computer blinding factor, and the second computer blinded public key. The second shared secret generated by the first computer may be the same as the second shared secret generated by the second computer. The first computer may derive a second session key from the second shared secret.

At 908, the first computer may decrypt the encrypted second computer blinding factor using the second shared secret to obtain the second computer blinding factor and the first computer may decrypt the encrypted second computer certificate using the second shared secret to obtain the second computer certificate. In some embodiments, the first computer may decrypt the encrypted second computer blinding factor and the encrypted second computer certificate using the second session key derived from the second shared secret.

At 909, the first computer may verify the second computer blinded public key. the first computer may verify the second computer blinded public key by generating a generated second computer blinded public key using the second computer public key (e.g., of the second computer certificate) and the second computer blinding factor, and comparing the generated second computer blinded public key to the second computer blinded public key received from the second computer.

At 910, the first computer may communicate with the second computer using the second shared secret. The first computer and the second computer may communicate in response to mutually authenticating each other.

B. Method for Confidential Mutual Authentication Performed by a Second Computer

Figure 10:
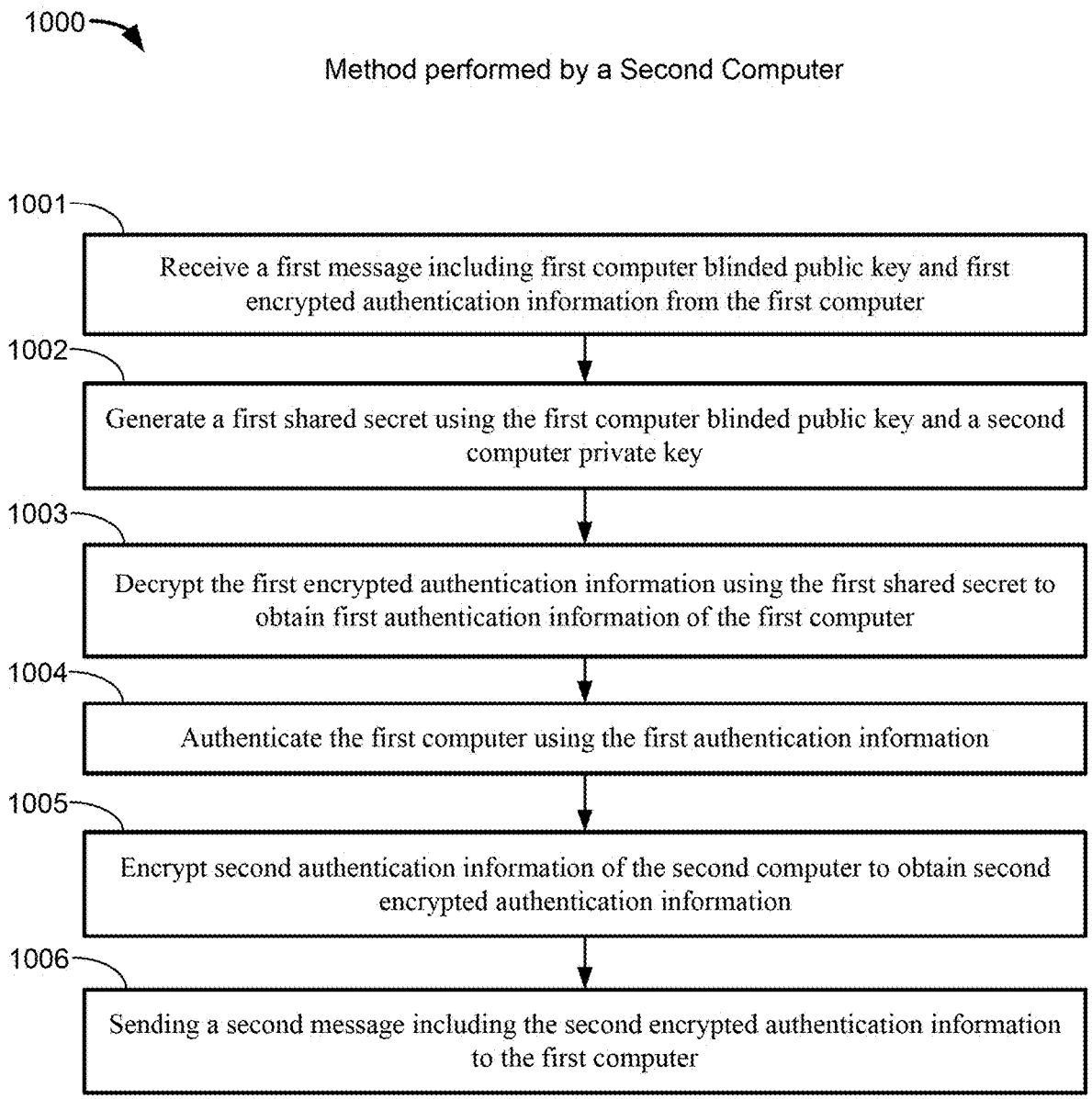
FIG. 10 shows a flowchart of a computer-implemented method for performing communications between a first computer and second computer for mutual authentication, in accordance with some embodiments.

FIG. 10 shows a flowchart 1000 of a computer-implemented method for performing communications between a first computer and second computer for mutual authentication, in accordance with some embodiments.

At 1001, the second computer may receive a first message including first computer blinded public key and first encrypted authentication information from the first computer, wherein the first computer blinded public is generated by the first computer using a first computer blinding factor and a first computer public key. In some embodiments, the first computer blinding factor may be a cryptographic nonce. In some embodiments, the encrypted first authentication may be decrypted to obtain first authentication information of the first computer. The first authentication information may include one or more of the first computer public key, the first computer blinding factor, a time stamp (e.g., a trusted time stamp generated by a trusted time server), a signature of the first computer public key, and a signer key identifier.

At 1002, in response to receiving the first message, the second computer may generate a first shared secret using the first computer blinded public key and a second computer private key.

At 1003, the second computer may decrypt the first encrypted authentication information using the first shared secret to obtain first authentication information of the first computer.

At 1004, the second computer may authenticate the first computer using the first authentication information. The second computer may authenticate the first computer based on comparing the first computer public key to one or more stored computer public keys to identify a matching computer public key. The second computer may authenticate the first computer based on comparing the timestamp from the first computer to a second timestamp of the second computer. The second computer may authenticate the first computer based on using the signer key identifier to retrieve (e.g., from a local database) a signer public key and validating the first signature using the signer public key and the first computer public key. The second computer may authenticate the first computer based on applying the first computer blinding factor to the first computer public key to obtain a generated blinded public key and comparing the generated blinded public key to the first computer blinded public key.

At 1005, in response to the authenticating of the first computer, the second computer may encrypt second authentication information of the second computer to obtain second encrypted authentication information, the encrypting of the second authentication information based on the second computer private key and the first computer public key. In some embodiments, the second computer may encrypt the second authentication information using the first shared secret which is based on the first computer blinded public key, thereby enabling the first computer to authenticate the second computer based on the first computer decrypting the second authentication information using the first shared secret.

In some embodiments, the second computer may generate a second shared secret using the first computer blinded public key, the second computer private key, and a second computer blinding factor and encrypt the second authentication information using the second shared secret. In some embodiments, the second computer may send, to the first computer, a second computer blinded public key that the second computer generated using a second computer public key corresponding to the second computer private key and the second computer blinding factor.

At 1006, the second computer may send a second message including the second encrypted authentication information to the first computer, thereby enabling the first computer to authenticate the second computer using the second authentication information.

C. Method for Confidential Mutual Authentication Performed by a First Computer

Figure 11:
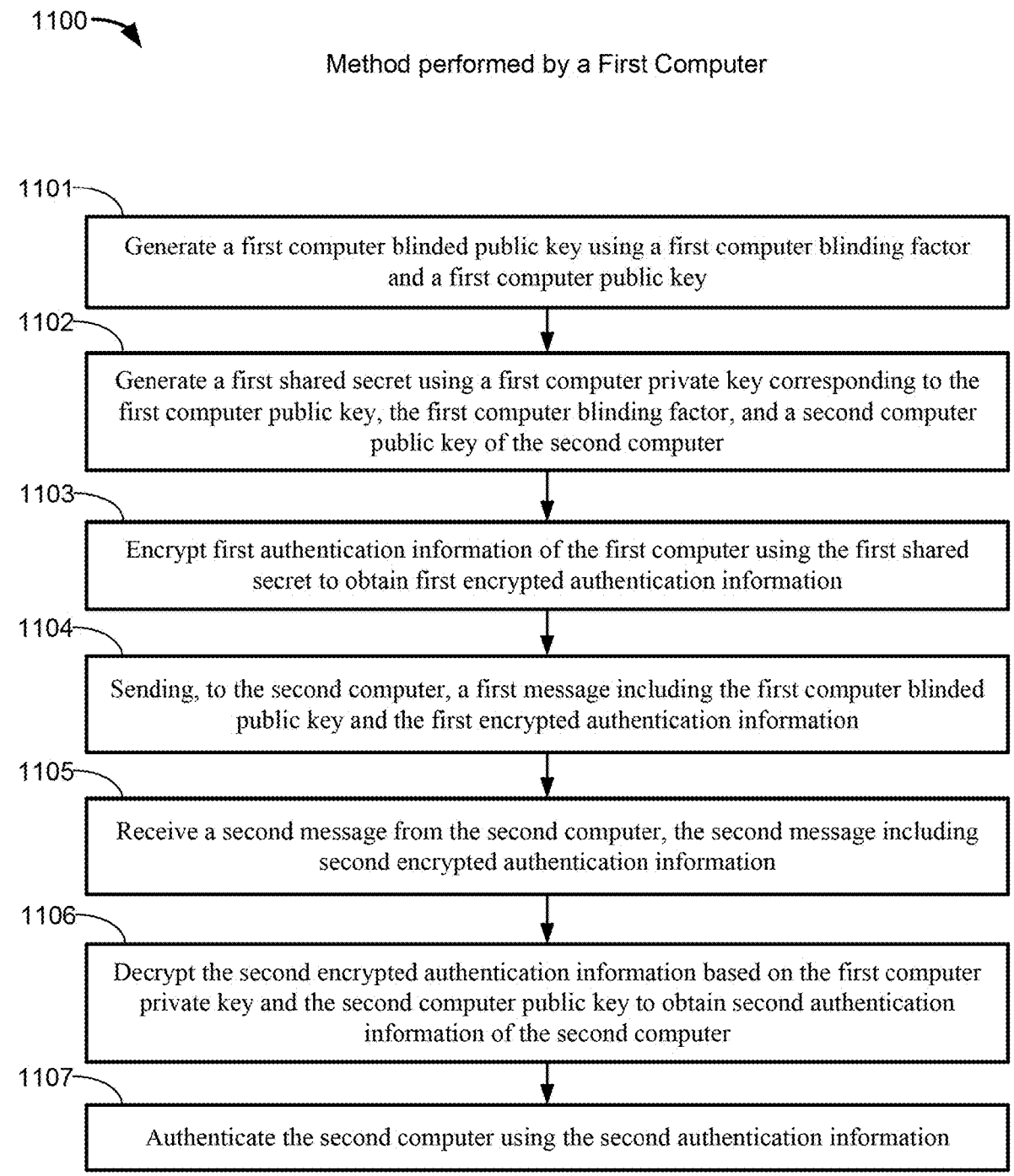
FIG. 11 shows a flowchart of a computer-implemented method for performing communications between a first computer and second computer for mutual authentication, in accordance with some embodiments.

FIG. 11 shows a flowchart 1100 of a computer-implemented method for performing communications between a first computer and second computer for mutual authentication, in accordance with some embodiments.

At 1101, the first computer may generate a first computer blinded public key using a first computer blinding factor and a first computer public key. In some embodiments, the first computer blinding factor may be a cryptographic nonce. At 1102, the first computer may generate a first shared secret using a first computer private key corresponding to the first computer public key, the first computer blinding factor, and a second computer public key of the second computer.

At 1103, the first computer may encrypt first authentication information of the first computer using the first shared secret to obtain first encrypted authentication information. The first authentication information may include one or more of the first computer public key, the first computer blinding factor, a time stamp (e.g., a trusted time stamp generated by a trusted time server), a signature of the first computer public key, and a signer key identifier.

At 1104, the first computer may send, to the second computer, a first message including the first computer blinded public key and the first encrypted authentication information, thereby enabling the second computer to generate the first shared secret using the first computer blinded public key and a second computer private key corresponding to the second computer public key, to decrypt the first encrypted authentication information, and to authenticate the first computer using the first authentication information. The second computer may authenticate the first computer based on comparing the first computer public key to one or more stored computer public keys to identify a matching computer public key. The second computer may authenticate the first computer based on comparing the timestamp from the first computer to a second timestamp of the second computer. The second computer may authenticate the first computer based on using the signer key identifier to retrieve a signer public key and validating the first signature using the signer public key and the first computer public key. The second computer may authenticate the first computer based on applying the first computer blinding factor to the first computer public key to obtain a generated blinded public key and comparing the generated blinded public key to the first computer blinded public key.

At 1105, the first computer may receive a second message from the second computer, the second message including second encrypted authentication information. At 1106, in response to receiving the second message, the first computer may decrypt the second encrypted authentication information based on the first computer private key and the second computer public key to obtain second authentication information of the second computer. In some embodiments, the second message may include a second computer blinded public key and the first computer may generate a second shared secret using the first computer private key, the first computer blinding factor, and the second computer blinded public key. The first computer may decrypt the second encrypted authentication information using the second shared secret. In some embodiments, the second authentication information may include a second computer blinding factor. In some embodiments, the second authentication information may include the second computer public key.

At 1107, the first computer may authenticate the second computer using the second authentication information. In some embodiments, authenticating the second computer may include verifying the second computer blinded public key using the second computer blinding factor and the second computer public key. In some embodiments, authenticating the second computer may include comparing the second computer public key to one or more stored computer public keys to identify a matching computer public key. In some embodiments, authenticating the second computer may include applying the second computer blinding factor to the second computer public key to obtain a generated blinded public key and comparing the generated blinded public key to the second computer blinded public key. In some embodiments, authenticating the second computer may include using a signer key identifier to retrieve a signer public key and validating a signature of the second computer using the signer public key and the second computer public key. The first computer may communicate further with the second computer based on the authenticating of the second computer.

VI. Detailed Methods for Mutual Authentication Using Secure and Confidential Communication Embodiments of the invention may utilize methods for secure communication. Some embodiments of the invention may establish secure communications according to the methods described below with respect to FIG. 12 and FIG. 13. Table 1, below, includes definitions of terms.

TABLE 1

| | |
|---|---|
| ICC | Mobile phone, Integrated Circuit chip or server |
| IFD | Interface device or client |
| enc_c | Encrypted data generated on client (IFD/Mobile) |
| enc_s | Encrypted data generated on server (ICC) |
| SD_c | Client sensitive Data (payload) |
| SD_s | Server sensitive Data (payload) |
| sID_s | Server (ICC) identifier for the session. Based on Q_bs x_coordinate |
| sID_c | Client (IFD or mobile device) identifier. Truncated value of Q_ec's x_coordinate |
| C_s | Certificate Chain authenticating the Server (ICC) |
| C_s_{n} | Certificate Chain authenticating the Server (ICC) - nth version |
| C_c | Certificate Chain authenticating the client (ICC) |
| d_bc | Client blinding factor |
| d_bs | Server Blinding factor |
| seed | Counter or time, etc. verifiable at ICC or server and proving that blinding factor is fresh. d_bc = PRNG (seed) |
| Q_bc | Blinded Client public key |
| Q_bs | Blinded server public key |
| d_c, Q_c = [d_c]P | Client authentication public key, matched with the corresponding private key: d_c |
| d_s, Q_s = [d_s]P | Server (ICC) authentication public key, matched with the corresponding private key: d_s |
| d_s_{n}, Q_s_{n} | Server (ICC) authentication public and private key, nth version. |
| d_ec, Q_ec = [d_ec]P | client ephemeral public key, matched with the ephemeral private key: d_ec |
| sk_1c, sk_c, sk_1s, sk_s | AES Secure Messaging Session Keys |
| Z, Z_1 | Intermediate Shared secrets (x-coordinate of EC-DH shared resulting point) |

-continued

TABLE 1

| | |
|---|---|
| AEAD, AEAD-1 (sk, data, associated data) | Authenticated Encryption with Associated Data (AES session key SK, data will be encrypted or decrypted. Associated data will remain as is, but controlled for integrity. |
| KDF | Key Derivation Function 800-56C based on AES C_MAC. Applied on concatenated input |
| PRNG | Pseudo random number generator |
| zero_key | AES key where all bytes have a zero value (see 800-56C) |
| PubK (C) | Extract the public key from Cert C |

A. Methods Assuming a Pre-Loaded Server Certificate

FIG. 12 shows a method for secure communication using a client computer that is pre-loaded with a server computer certificate, in accordance with some embodiments. The client computer may maintain data prior to the communication. For example, the client computer can maintain a number (n) server authentication public keys (Q_s_{n}) and server computer certificate chains (C_s_{n}). The client computer can also maintain client sensitive data (SD_c), which may include data usable by a server computer to authenticate the client computer. In addition, the client computer can maintain a client computer certificate chain (C_c) and a client authentication key pair including a client authentication public key (Q_c) and a corresponding client authentication private key (d_c). Furthermore, the client computer can maintain a seed value (seed) that is typically verifiable by the server computer.

The server computer may also maintain data prior to the communication. For example, the server computer can maintain a number (n) server computer certificate chains (C_s_{n}), each including a server authentication public key (Q_s_{n}) and the server computer maintaining a corresponding server authentication private key (d_s_{n}). The server computer can also maintain a next server authentication key pair including a next server authentication public key (Q_s_{n+1}) and a next server authentication private key (d_s_{n+1}). The server computer can also maintain an initialization value (IV) and server sensitive data (SD_s), which may include data usable by a client computer to authenticate the server computer.

At step 1201, the client computer generates a client blinding factor (d_bc) using a PRNG function with the seed value as an input.

At step 1202, the client computer generates a blinded client authentication public key (Q_bc) using the client blinding factor, an initialization value (d_iv), and the client authentication public key.

At step 1203, the client computer generates a first shared secret (Z_1) using the client authentication public key, the client blinding factor, and the server authentication public key corresponding to the server computer for which communication is intended (Q_s_{n}).

At step 1204, a client session identifier is generated using the blinded client authentication public key.

At step 1205, a first client session key is derived using the first shared secret, a server identifier (ID_s), and the client session identifier.

At step 1206, the first client session key is used to encrypt (AEAD) the client sensitive data, the client certificate chain, either the client blinding factor or the seed, some client padding data (PAD_c), and the blinded client authentication public key. The result is encrypted client data (enc_c).

At step 1207, the first shared secret and the first client session key are zeroized (i.e., erased).

At step 1208, the blinded client authentication public key ad the client encrypted data are sent to the server computer.

At step 1209, the server computer validates that the blinded client authentication public key belongs to the correct elliptic curve domain.

At step 1210, the server computer generates the same first shared secret, but using the server authentication private key, the initialization value, and the blinded client authentication public key.

At step 1211, the server computer determines the client session identifier from the blinded client authentication public key.

At step 1212, the server computer derives the first client session key using the first shard secret, the server identifier, and the client session identifier.

At step 1213, the server computer decrypts (AEAD-1) the encrypted client data using the first client session key to obtain the client sensitive data, the client certificate chain, the client blinding factor or seed, and the client padding data.

At step 1214, the server computer zeroizes the first client session key and the first shard secret.

At step 1215, if the client blinding factor was not included in the encrypted client data decrypted at step 1213, the server computer derives it from the seed using a PRNG function.

At step 1216, the server computer extracts the client authentication public key from the client certificate. The client certificate is also validated.

At step 1217, the blinded client authentication public key received from the client computer is compared to a combination of the client blinding factor and the client authentication public key. If they match, the server computer can authenticate the client computer.

At step 1218, the server computer generates a server blinding factor (d_bs).

At step 1219, a second shared secret (Z) is generated using the second blinding factor, the next server authentication private key, and the blinded client authentication public key.

At step 1220, a blinded server authentication public key (Q_bs) is generated using the server authentication public key and the server blinding factor.

At step 1221, a server session identifier (sID_s) is generated using the blinded server authentication public key.

At step 1222, a server session key (sk_s) and a second client session key (sk_c) are generated using the second shared secret, the server session identifier, and the client session identifier.

At step 1223, the server blinding factor, the next server certificate chain, the server sensitive data, and a server pad (PAD_s) are encrypted using the server session key to generate encrypted server data (enc_s).

At step 1224, the server session key and the second shared secret are zeroized.

At step 1225, the blinded server authentication public key and the encrypted server data are sent to the client computer.

At step 1226, the client computer validates that the blinded server authentication public key belongs to the correct EC domain.

At step 1227, the client computer determines the second shared secret using a combination of the client authentication private key and the client blinding factor, and the blinded server authentication public key.

At step 1228, the client computer determines the server session identifier using the blinded server computer public key.

At step 1229, the client computer derives the server session key and the second client session key using the second shared secret, the server session identifier, and the client session identifier.

At step 1230, the client computer zeroizes the second session key and the client blinding factor.

At step 1231, the client computer decrypts (AEAD-1) the encrypted server data using the server session key to obtain the server blinding factor, the next server certificate chain, the server sensitive data, and the server pad.

At step 1232, the client computer extracts the next server authentication public key from the next server certificate chain.

At step 1233, the client computer validates that the next server certificate chain belongs to the correct elliptic curve domain.

At step 1234, the client computer validates that the combination of the next server authentication public key and the server blinding factor equals the blinded server authentication public key.

At step 1235, the client computer and sever computer can end communication or continue secure messaging using the second client session key and/or the server session key.

B. Methods Including Transfer of a Server Certificate

FIG. 13 shows a method for secure communication using a client computer that is not pre-loaded with a server computer certificate, in accordance with some embodiments. The client computer may maintain data prior to the communication. For example, the client computer can maintain a client computer certificate chain (C_c) and a client authentication key pair including a client authentication public key (Q_c) and a corresponding client authentication private key (d_c).

The server computer may also maintain data prior to the communication. For example, the server computer can maintain a server computer certificate chain (C_s), including a server authentication public key (Q_s) and the server computer maintaining a corresponding server authentication private key (d_s). The server computer can also maintain server sensitive data (SD_s), which may include data usable by a client computer to authenticate the server computer.

At step 1301, the client computer generates a client blinding factor (d_bc).

At step 1302, the client computer combines the blinding factor with the client authentication public key to determine a blinded client authentication public key (Q_bc).

At step 1303, the client computer determines a client session identifier (sID_c) using the blinded client authentication public key.

At step 1304, the client computer sends the blinded client authentication public key to the server computer.

At step 1305, the server computer ensures that the blinded client authentication public key belongs to the correct elliptic curve (EC) domain.

At step 1306, the server computer generates a server blinding factor (d_bs).

At step 1307, the server computer generates a shared secret (Z) using a combination of the server authentication private key and the server blinding factor, and the blinded client authentication public key.

At step 1308, the server computer combines the server authentication public key and the server blinding factor to determine a blinded server authentication public key (Q_bs).

At step 1309, the server computer determines a client session identifier (sID_c) using the blinded client authentication public key.

At step 1310, the server computer determines a server session identifier (sID_s) using the blinded server authentication public key.

At step 1311, the server computer generates a server session key and a client session key using the shared secret, the client session identifier, and the server session identifier.

At step 1312, the server computer encrypts the server blinding factor, the server certificate chain, the server sensitive data, and a server pad (PAD_s) using the server session key to determine server encrypted data (enc_s).

At step 1313, the server session key and the shared secret are zeroized.

At step 1314, the blinded server authentication public key and the server encrypted data are sent to the client computer.

At step 1315, the client computer validates that the blinded server authentication public key belongs to the correct EC domain.

At step 1316, the client computer determines the shared secret using a combination of the client authentication private key and the client blinding factor, and the blinded server authentication public key.

At step 1317, the client computer determines the server session identifier using the blinded server authentication public key.

At step 1318, the client computer determines the server session key and the client session key using the shared secret, the server session identifier, and the client session identifier.

At step 1319, the client computer zeroizes the shared secret and the client blinding factor.

At step 1320, the client computer decrypts the server encrypted data using the server session key to obtain the server blinding factor, the server certificate chain, the server sensitive data, and the server pad.

At step 1321, the client computer extracts the server authentication public key from the server certificate chain.

At step 1322, the client computer validates that the server authentication public key belongs to the correct EC domain.

At step 1323, the client computer verifies the server certificate chain.

At step 1324, the client computer ensures that the combination of the server blinding factor and the server authentication public key is equal to the blinded server authentication public key received from the server computer.

At step 1325, the server blinding factor is zeroized.

At step 1326, if at step 24 the check is successful, the server computer is authenticated at the client computer.

At step 1327, client encrypted data (enc_c) is generated by encrypting the client blinding factor, the client certificate chain, the client sensitive data, and a client pad (PAD_c) using the client session key.

At step 1328, the client computer sends the client encrypted data to the server computer.

At step 1329, the server computer decrypts the client encrypted data using the client session key to obtain the client blinding factor, the client certificate chain, the client sensitive data, and the client pad.

At step 1330, the server computer extracts the client authentication public key from the client certificate chain and validates the client certificate chain.

At step 1331, the server computer ensures that the combination of the client blinding factor and the client authentication public key matches the blinded client authentication public key received from the client computer. If they match, at step 33 the client computer is authenticated by the server computer.

At step 1332, the client blinding factor is zeroized.

At step 1334, the client computer and sever computer can end communication or continue secure messaging using the second client session key and/or the server session key.

The above description is illustrative and is not restrictive. Many variations of the invention may become apparent to those skilled in the art upon review of the disclosure. The scope of the invention may, therefore, be determined not with reference to the above description, but instead may be determined with reference to the pending claims along with their full scope or equivalents.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, units, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the invention has been presented for the purposes of illustration and description. It is not intended to be exhaustive or to limit the invention to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned herein are incorporated by reference in their entirety for all purposes. None is admitted to be prior art.

What is claimed is:

1. A computer-implemented method for performing communications between a first computer and second computer, the method comprising performing, by the second computer:
   receiving a first message including a first computer blinded public key and first encrypted authentication information from the first computer, wherein the first computer blinded public key is generated by the first computer using a first computer blinding factor and a first computer public key;
   in response to receiving the first message, generating a first shared secret using the first computer blinded public key and a second computer private key;
   decrypting the first encrypted authentication information using the first shared secret to obtain first authentication information of the first computer;
   authenticating the first computer using the first authentication information;
   in response to the authenticating of the first computer, encrypting second authentication information of the second computer to obtain second encrypted authentication information, the encrypting of the second authentication information based on the second computer private key and the first computer public key; and sending a second message including the second encrypted authentication information to the first computer, thereby enabling the first computer to authenticate the second computer using the second authentication information, wherein the first authentication information includes the first computer blinding factor and the first computer public key, and wherein authenticating the first computer further comprises:

applying the first computer blinding factor to the first computer public key to obtain a generated blinded public key; and comparing the generated blinded public key to the first computer blinded public key.

2. The method of claim 1, wherein the second computer performs the encrypting of the second authentication information using the first shared secret, thereby enabling the first computer to decrypt the encrypted second authentication information and authenticate the second computer based on the second computer performing the encrypting of the second authentication information using the first shared secret.

3. The method of claim 1, wherein the first authentication information includes the first computer public key, and wherein authenticating the first computer includes comparing the first computer public key to one or more stored computer public keys to identify a matching computer public key.

4. The method of claim 1, wherein the first authentication information includes a first timestamp of the first computer, and wherein authenticating the first computer includes comparing the first timestamp to a second timestamp of the second computer.

5. The method of claim 1, wherein the first computer blinding factor is generated using a pseudo-random number generator, and wherein the first computer blinded public key is determined from the first computer blinding factor using an elliptic curve public key algorithm.

6. A computer-implemented method for performing communications between a first computer and second computer, the method comprising performing, by the first computer:

generating a first computer blinded public key using a first computer blinding factor and a first computer public key;

generating a first shared secret using a first computer private key corresponding to the first computer public key, the first computer blinding factor, and a second computer public key of the second computer;

encrypting first authentication information of the first computer using the first shared secret to obtain first encrypted authentication information;

sending, to the second computer, a first message including the first computer blinded public key and the first encrypted authentication information, thereby enabling the second computer to generate the first shared secret using the first computer blinded public key and a second computer private key corresponding to the second computer public key, to decrypt the first encrypted authentication information, and to authenticate the first computer using the first authentication information;

receiving a second message from the second computer, the second message including second encrypted authentication information;

in response to receiving the second message, decrypting the second encrypted authentication information based on the first computer private key and the second computer public key to obtain second authentication information of the second computer; and authenticating the second computer using the second authentication information, wherein the second authentication information includes the second computer public key, and wherein authenticating the second computer further comprises comparing the second computer public key to one or more stored computer public keys to identify a matching computer public key.

7. The method of claim 6, further comprising performing, by the first computer, communicating with the second computer in response to the authenticating of the second computer.

8. The method of claim 6, further comprising performing, by the first computer:

generating, a second shared secret using the first computer private key, the first computer blinding factor, and a second computer blinded public key, wherein the second message included the second computer blinded public key, wherein the first computer performs the decrypting of the second encrypted authentication information using the second shared secret, wherein the second authentication information includes a second computer blinding factor; and verifying the second computer blinded public key using the second computer blinding factor and the second computer public key, wherein the authenticating of the second computer is based on the verifying of the second computer blinded public key.

9. A computer-implemented method for performing communications between a first computer and a second computer, the method comprising performing, by the first computer:

receiving a first message including a second computer blinded public key from the second computer, wherein the second computer blinded public key is generated by the second computer using a second computer blinding factor and a second computer public key that corresponds to a second computer private key;

generating a first computer blinded public key using a first computer blinding factor and a first computer public key;

generating a first shared secret using a first computer private key corresponding to the first computer public key, the first computer blinding factor, and the second computer blinded public key;

sending a second message including the first computer blinded public key to the second computer, thereby enabling the second computer to generate the first shared secret using the first computer blinded public key, the second computer blinding factor, and the second computer private key corresponding to the second computer public key; and communicating with the second computer using the first shared secret.

10. The method of claim 9, further comprising performing, by the first computer:

generating a second shared secret using the second computer blinded public key and the first computer private key, wherein the first message further includes an encrypted second computer blinding factor and an encrypted second computer certificate from the second computer;

decrypting the encrypted second computer blinding factor using the second shared secret to obtain the second computer blinding factor;

decrypting the encrypted second computer certificate using the second shared secret to obtain a second computer certificate including the second computer public key; and authenticating, by the first computer, the second computer blinded public key received from the second computer using the second computer blinding factor and the second computer public key, wherein the sending of the second message to the second computer is in response to verifying of the second computer blinded public key.

11. The method of claim 10, wherein verifying the second computer blinded public key received from the second computer further comprises performing, by the first computer:

generating a generated second computer blinded public key using the second computer public key of the second computer certificate and the second computer blinding factor; and comparing the generated second computer blinded public key and the second computer blinded public key received from the second computer.

12. The method of claim 9, further comprising performing, by the first computer:

receiving an encrypted second computer blinding factor remainder and an encrypted second computer certificate from the second computer;

generating a second shared secret using the second computer blinded public key and the first computer private key;

decrypting the encrypted second computer blinding factor remainder using a second session key to obtain a second computer blinding factor remainder;

decrypting the encrypted second computer certificate using the second shared secret to obtain a second computer certificate, the second computer certificate including the second computer public key; and verifying the second computer blinded public key using the second computer blinding factor remainder, a counter value, and the second computer public key of the second computer certificate, wherein the second computer blinding factor is generated by the second computer using the counter value and the second computer blinding factor remainder.

13. The method of claim 12, wherein the second session key is generated using the second shared secret, a first session identifier, and a second session identifier, the first session identifier is generated using a blinded first authentication public key, and wherein the second session identifier is generated using a blinded second authentication public key.

14. The method of claim 9, further comprising performing, by the first computer:

receiving an encrypted challenge from the second computer;

generating a second shared secret using the second computer blinded public key and the first computer private key;

decrypting the encrypted challenge using the second shared secret to obtain a second computer challenge; and verifying the second computer challenge received from the second computer using a stored challenge stored at the first computer.

15. The method of claim 9, further comprising performing, by the first computer:

receiving an encrypted second computer blinding factor remainder and an encrypted second computer certificate from the second computer;

generating a second shared secret using the second computer blinded public key and the first computer private key;

decrypting the encrypted second computer blinding factor remainder using a second session key to obtain a second computer blinding factor remainder;

decrypting the encrypted second computer certificate using the second session key to obtain a second computer certificate including the second computer public key; and verifying the second computer blinded public key using the second computer blinding factor remainder, a stored challenge, and the second computer public key of the second computer certificate, wherein the second computer blinding factor is generated by the second computer using a challenge and the second computer blinding factor remainder, wherein the first computer sends the challenge to the second computer, the challenge being the same as the stored challenge.

16. The method of claim 9, further comprising performing, by the first computer, sending at least one of a first computer certificate, a counter, and a challenge to the second computer.

17. A computer-implemented method for performing communications between a first computer and second computer, the method comprising performing, by the second computer:

generating a second computer blinded public key using a second computer blinding factor and a second computer public key;

sending the second computer blinded public key to the first computer;

receiving a first computer blinded public key from the first computer, wherein the first computer generated the first computer blinded public key using a first computer blinding factor and a first computer public key;

generating a first shared secret using the first computer blinded public key, the second computer blinding factor, and a second computer private key corresponding to the second computer public key; and communicating with the first computer using the first shared secret.

18. The method of claim 17, further comprising performing, by the second computer:

obtaining a second counter, the second counter being the same as a first counter of the first computer;

generating the second computer blinding factor based on a counter value of the second counter;

generating a second computer blinding factor remainder based on the second computer blinding factor and the counter value;

encrypting the second computer blinding factor remainder using a second shared secret to obtain an encrypted second computer blinding factor remainder; and sending the encrypted second computer blinding factor remainder to the first computer.

* * * * *